United States Patent
Ciuperca

(10) Patent No.: US 9,410,321 B2
(45) Date of Patent: *Aug. 9, 2016

(54) HIGH PERFORMANCE, REINFORCED INSULATED PRECAST CONCRETE AND TILT-UP CONCRETE STRUCTURES AND METHODS OF MAKING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,171

(22) Filed: Mar. 20, 2016

(65) Prior Publication Data

US 2016/0201327 A1  Jul. 14, 2016

Related U.S. Application Data

(63) Continuation of application No. 13/834,574, filed on Mar. 15, 2013, now Pat. No. 8,844,227, and a continuation of application No. 14/499,208, filed on Sep. 28, 2014, now Pat. No. 9,003,740, and a continuation of application No. 14/684,899, filed on Apr. 13, 2015, now Pat. No. 9,290,939.

(51) Int. Cl.
| | |
|---|---|
| *E04C 5/12* | (2006.01) |
| *E04C 5/16* | (2006.01) |
| *E04C 2/26* | (2006.01) |
| *E04C 2/20* | (2006.01) |
| *E04C 2/04* | (2006.01) |
| *E04C 2/06* | (2006.01) |

(52) U.S. Cl.
CPC . *E04C 5/12* (2013.01); *E04C 2/044* (2013.01); *E04C 2/06* (2013.01); *E04C 2/205* (2013.01); *E04C 2/26* (2013.01); *E04C 5/125* (2013.01); *E04C 5/127* (2013.01); *E04C 5/16* (2013.01)

(58) Field of Classification Search
CPC ............. E04C 5/20; E04C 5/168; E04C 5/18; E04C 2/296; E04C 2/292; B29C 65/30325
See application file for complete search history.

(56) References Cited

U.S. PATENT DOCUMENTS

| | | | |
|---|---|---|---|
| 2,053,135 A | 9/1936 | Dalton | |
| 3,199,828 A | 8/1965 | Newton | |
| 3,596,423 A * | 8/1971 | Jacobus | ................... E04C 2/06 52/332 |
| 3,649,725 A | 3/1972 | Olson | |

(Continued)

FOREIGN PATENT DOCUMENTS

EP  2065530 A2  6/2009

*Primary Examiner* — Brian Glessner
*Assistant Examiner* — Paola Agudelo
(74) *Attorney, Agent, or Firm* — Robert E. Richards; Richards IP Law

(57) ABSTRACT

The invention comprises a product. The product comprises a foam insulating panel, the panel having a first primary surface and an opposite second primary surface, wherein the foam insulating panel defines at least one recessed channel in the first primary surface, the at least one recessed channel being sized and shaped to provide a mold for a structural reinforcing member. The product also comprises a concrete panel formed on the first primary surface and filling the at least one recessed channel so as to provide a structural reinforcing member for the concrete panel. The product further comprises an elongate anchor member in the foam insulating panel and extending from the first primary surface of the foam insulating panel into the concrete panel. A method of making a composite reinforced insulated concrete structure is also disclosed.

18 Claims, 17 Drawing Sheets

(56) References Cited

U.S. PATENT DOCUMENTS

| | | | |
|---|---|---|---|
| 3,732,138 A | 5/1973 | Almog | |
| 3,985,329 A | 10/1976 | Liedgens | |
| 4,052,031 A | 10/1977 | Melfi | |
| 4,085,495 A | 4/1978 | Hebert | |
| 4,090,336 A | 5/1978 | Carroll | |
| 4,157,638 A | 6/1979 | Della-Donna | |
| 4,334,394 A * | 6/1982 | Mader | E04F 13/04 52/309.12 |
| 4,349,398 A | 9/1982 | Kearns et al. | |
| 4,370,840 A | 2/1983 | Bisbee et al. | |
| 4,516,372 A | 5/1985 | Grutsch | |
| 4,646,498 A | 3/1987 | Schneller et al. | |
| 4,669,234 A | 6/1987 | Wilnau | |
| 4,744,849 A | 5/1988 | Michaud-Soret | |
| 4,765,109 A | 8/1988 | Boeshart | |
| 4,811,927 A | 3/1989 | Slonimsky et al. | |
| 4,866,897 A | 9/1989 | Yount | |
| 4,885,888 A | 12/1989 | Young | |
| 4,889,310 A | 12/1989 | Boeshart | |
| 4,907,386 A | 3/1990 | Ekroth | |
| 4,947,600 A | 8/1990 | Porter | |
| 5,107,648 A | 4/1992 | Roby | |
| 5,171,118 A * | 12/1992 | Rothenbuhler | E04B 1/762 411/480 |
| 5,217,339 A | 6/1993 | O'Connor et al. | |
| 5,323,578 A | 6/1994 | Chagnon et al. | |
| D357,855 S | 5/1995 | Keith et al. | |
| 5,493,837 A * | 2/1996 | Hepler | E04C 2/296 52/363 |
| 5,497,592 A | 3/1996 | Boeshart | |
| 5,570,550 A | 11/1996 | Roby | |
| 5,606,832 A | 3/1997 | Keith et al. | |
| 5,611,182 A | 3/1997 | Spude | |
| 5,761,874 A | 6/1998 | Hayakawa | |
| 5,765,318 A | 6/1998 | Michelsen | |
| 5,792,552 A | 8/1998 | Langkamp et al. | |
| 5,809,723 A | 9/1998 | Keith et al. | |
| 5,809,725 A | 9/1998 | Cretti | |
| 5,809,726 A | 9/1998 | Spude | |
| 5,809,728 A | 9/1998 | Tremelling | |
| 5,819,489 A | 10/1998 | McKinney | |
| 5,836,126 A | 11/1998 | Harkenrider et al. | |
| 5,966,885 A | 10/1999 | Chatelain | |
| 5,992,114 A | 11/1999 | Zelinsky et al. | |
| 6,026,620 A | 2/2000 | Spude | |
| 6,134,861 A | 10/2000 | Spude | |
| 6,138,981 A | 10/2000 | Keith et al. | |
| 6,234,736 B1 | 5/2001 | Miescher | |
| 6,263,638 B1 | 7/2001 | Long, Sr. | |
| 6,305,135 B1 * | 10/2001 | Inaba | B32B 3/30 52/309.12 |
| 6,314,694 B1 | 11/2001 | Cooper | E04B 2/8611 249/190 |
| 6,360,505 B1 | 3/2002 | Johns | |
| 6,426,029 B1 | 7/2002 | Hiscock et al. | |
| 6,612,083 B1 | 9/2003 | Richards | |
| 6,688,066 B1 | 2/2004 | Cottier et al. | |
| 6,725,616 B1 * | 4/2004 | Pease | E04B 1/762 52/309.12 |
| 6,729,090 B2 | 5/2004 | Messenger et al. | |
| 6,898,908 B2 | 5/2005 | Messenger et al. | |
| 6,898,912 B2 | 5/2005 | Bravinski | |
| 6,935,081 B2 | 8/2005 | Dunn et al. | |
| 7,000,359 B2 | 2/2006 | Meyer | |
| 7,398,131 B2 | 7/2008 | Trost et al. | |
| 7,409,800 B2 | 8/2008 | Budge | |
| 7,765,761 B2 | 8/2010 | Paradis | |
| 7,818,935 B2 | 10/2010 | Velickovic | |
| 7,934,693 B2 | 5/2011 | Bravinski | |
| 3,032,244 A1 | 10/2011 | Trost et al. | |
| 8,532,815 B1 | 9/2013 | Ciuperca | |
| 8,555,583 B2 | 10/2013 | Ciuperca | |
| 8,555,584 B2 | 10/2013 | Ciuperca | |
| 8,636,941 B1 | 1/2014 | Ciuperca | |
| 8,745,943 B2 | 6/2014 | Ciuperca | |
| 8,756,890 B2 | 6/2014 | Ciuperca | |
| 8,844,227 B1 | 9/2014 | Ciuperca | |
| 8,855,803 B2 | 10/2014 | Ciuperca | |
| 8,877,329 B2 | 11/2014 | Ciuperca | |
| 8,950,137 B2 | 2/2015 | Ciuperca | |
| 8,951,460 B2 | 2/2015 | Ciuperca | |
| 8,966,845 B1 | 3/2015 | Ciuperca | |
| 9,003,740 B2 | 4/2015 | Ciuperca | |
| 9,074,379 B2 | 7/2015 | Ciuperca | |
| 9,114,549 B2 | 8/2015 | Ciuperca | |
| 9,115,503 B2 | 8/2015 | Ciuperca | |
| 9,145,695 B2 | 9/2015 | Ciuperca | |
| 9,181,699 B2 | 11/2015 | Ciuperca | |
| 9,290,939 B2 | 3/2016 | Ciuperca | |
| 2002/0005725 A1 | 1/2002 | Scott | |
| 2002/0014048 A1 * | 2/2002 | Meendering | E04B 2/8652 52/426 |
| 2002/0092253 A1 | 7/2002 | Beliveau | |
| 2003/0192272 A1 | 10/2003 | Bravinski | |
| 2004/0129857 A1 | 7/2004 | Musk et al. | |
| 2004/0177580 A1 * | 9/2004 | Tremelling | E04B 2/8617 52/426 |
| 2005/0108985 A1 | 5/2005 | Bravinski | |
| 2007/0062143 A1 | 3/2007 | Noushad | |
| 2007/0095255 A1 | 5/2007 | Abbate et al. | |
| 2007/0144653 A1 | 6/2007 | Padilla et al. | |
| 2008/0041004 A1 | 2/2008 | Gibbar et al. | |
| 2008/0173788 A1 | 7/2008 | Brewka et al. | |
| 2008/0313991 A1 | 12/2008 | Chouinard | |
| 2009/0202307 A1 | 8/2009 | Au et al. | |
| 2009/0218474 A1 | 9/2009 | Bowman | |
| 2009/0277103 A1 | 11/2009 | De Jaham | |
| 2010/0062667 A1 | 3/2010 | Pan et al. | |
| 2010/0162659 A1 | 7/2010 | Laprise | |
| 2010/0192498 A1 | 8/2010 | Gleckman | |
| 2010/0232877 A1 | 9/2010 | Sanvik et al. | |
| 2010/0319295 A1 | 12/2010 | Nelson | |
| 2011/0057090 A1 | 3/2011 | Spude et al. | |
| 2011/0061329 A1 * | 3/2011 | Tadros | E04C 2/044 52/583.1 |
| 2011/0239566 A1 * | 10/2011 | Ciuperca | B23P 11/00 52/259 |
| 2012/0058299 A1 | 3/2012 | Serwin | |
| 2013/0343734 A1 | 12/2013 | Dock, II et al. | |
| 2014/0272302 A1 | 9/2014 | Ciuperca | |
| 2014/0333004 A1 | 11/2014 | Ciuperca | |
| 2014/0333010 A1 | 11/2014 | Ciuperca | |
| 2015/0069647 A1 | 3/2015 | Ciuperca | |
| 2015/0069664 A1 | 3/2015 | Ciuperca | |
| 2015/0184383 A1 * | 7/2015 | Foderberg | E04C 2/049 52/405.1 |
| 2015/0266783 A1 | 9/2015 | Ciuperca | |

* cited by examiner

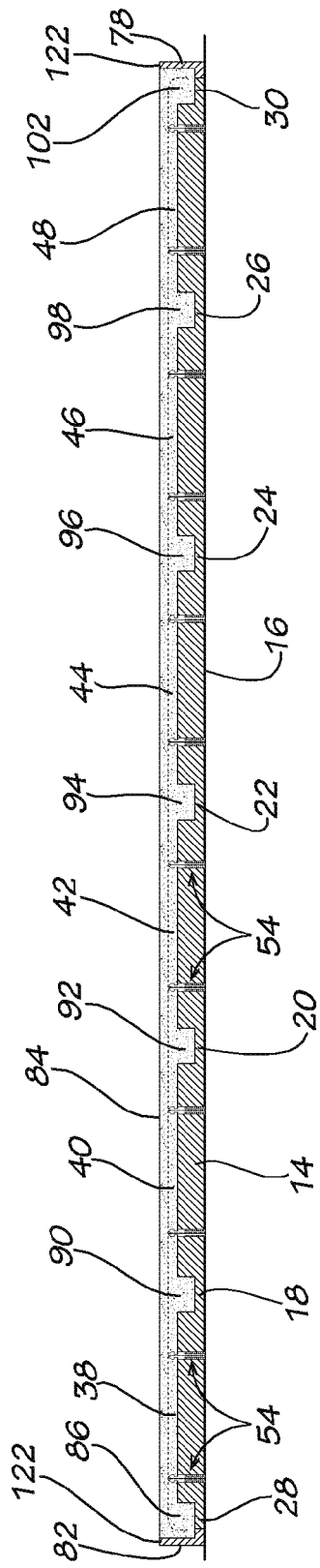
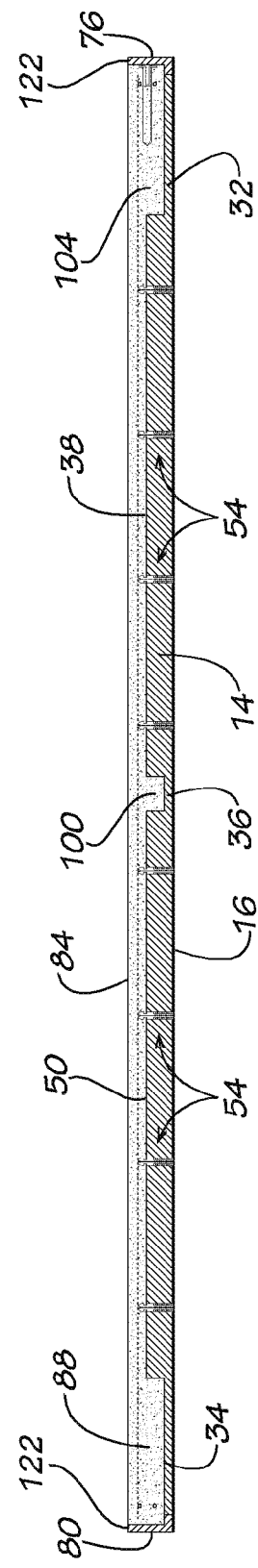
FIG. 2
FIG. 3

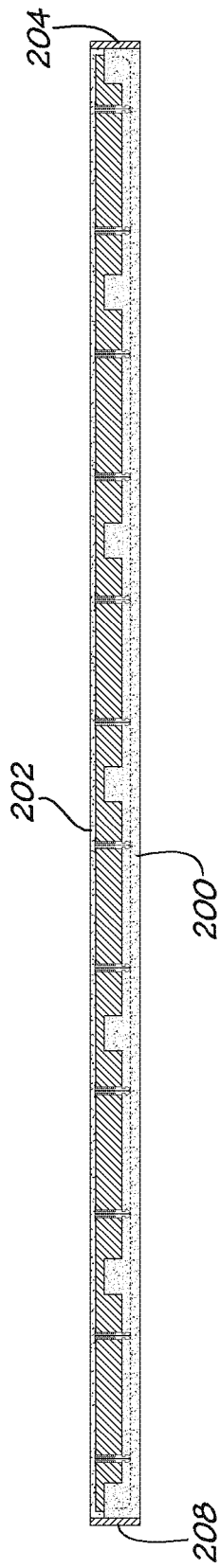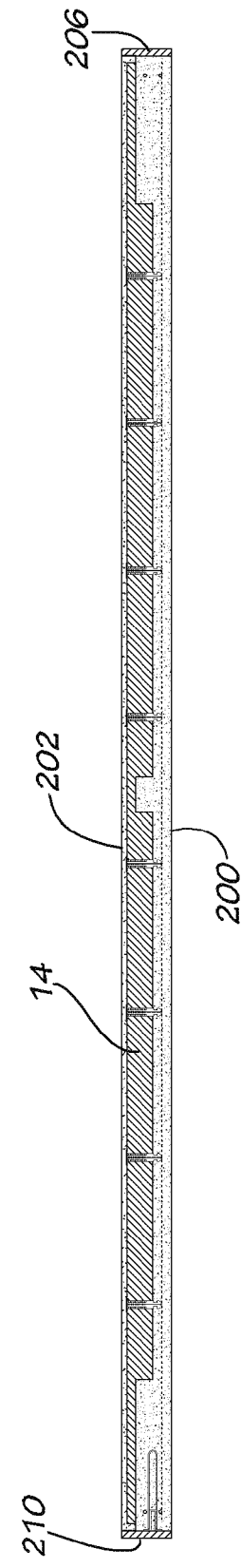
FIG. 8
FIG. 9

HIGH PERFORMANCE, REINFORCED INSULATED PRECAST CONCRETE AND TILT-UP CONCRETE STRUCTURES AND METHODS OF MAKING SAME

CROSS-REFERENCE TO RELATED APPLICATIONS

The present application is a continuation of application Ser. No. 14/684,899 filed Apr. 13, 2015, now U.S. Pat. No. 9,290,939, which is a continuation of application Ser. No. 14/499,208 filed Sep. 28, 2014, now U.S. Pat. No. 9,003,740, which is a continuation of application Ser. No. 13/834,574 filed Mar. 15, 2013, now U.S. Pat. No. 8,844,227.

FIELD OF THE INVENTION

The present invention generally relates to the forming of concrete structures. More particularly, this invention relates to precast concrete structures, especially precast and tilt-up concrete panels. The present invention also relates to insulated precast and tilt-up concrete panels, especially architectural structural loadbearing precast and tilt-up concrete panels. The present invention also relates to a reinforced insulated concrete panel or structure that uses less concrete and reinforcing steel than a conventional structure or panel. The present invention also relates to methods of making insulated precast concrete structures and insulated precast tilt-up concrete structures, especially concrete panels. The present inventions relates to an insulated precast roof panel system. The present inventions also related to highway noise barrier systems that can absorb and reflect sound. The present invention further relates to a highly energy efficient building system that reduces energy consumption.

BACKGROUND OF THE INVENTION

In the United States, approximately 40% of energy consumption is used to heat and cool buildings. In buildings, the majority of energy loss takes place through the building envelope. The building envelope consists of doors/windows, exterior wall systems and roofing systems. In addition buildings should not only be energy efficient but also should be able to withstand natural disasters, such as floods, hurricanes, tornadoes, earthquakes, and the like. Therefore, building envelopes needs to be both resilient and highly energy efficient.

Framed walls use metal or wood studs to build a frame that can be either loadbearing or infill. Multistory buildings can be made from cast-in-place concrete with the exterior perimeter walls being in-filled frame construction. Exterior sheathing is attached to the outside of the frame. On the inside, drywall is typically used for the inside finish surface. This framing system creates a cavity between the exterior sheathing and the drywall. This cavity is then filled with batt insulation to improve energy efficiency. It is assumed that the R-value of the batt insulation determines the energy efficiency of the wall system. However, there are several drawback of this system. Framing members create thermal bridging. Batt insulation may not completely fill the cavity wall and over time it can sag, leaving no insulation in some places. Moisture condensation inside the cavity wall is common which dampens and compresses the batt insulation. When this occurs, the damp batt insulation loses most, if not all, insulating properties. HVAC systems create pressure differentials between the interior and the exterior of the building. These pressure differences cause air to move through the exterior wall system. Simply stated, cavity wall framed systems have poor energy efficiency, among many other problems. In addition, framing construction has a very poor record sustaining storm and flood damage. More and more jurisdictions require use of resilient home construction systems. In fact FEMA has an entirely new certification for resilient homes and means to prevent damage arising from natural disasters.

Exterior walls can also be made of concrete, either pre-cast or cast-in-place. Concrete is a composite material comprising a mineral-based hydraulic binder which acts to adhere mineral particulates together in a solid mass; those particulates may consist of coarse aggregate (rock or gravel), and/or fine aggregate (natural sand or crushed fines). While concrete provides a long lifespan and increased protection from damage, concrete is as cold or as hot as the ambient temperature. Concrete has high thermal mass, which makes it rather expensive to heat or cool in extreme temperatures. In an attempt to alleviate this problem, the inside of a concrete building may be insulated. However, such insulation does little to improve energy efficiency as it is generally on the wrong side of the wall; i.e., the interior wall surface. Concrete walls have the advantage that they are barrier systems; i.e., no air can flow through from inside to the outside, but still have poor energy efficiency. While concrete-type building construction does very well in storms and floods, it does not do as well in seismic areas due to its massive weight and minimal flexibility.

Precast or structural concrete wall panels are known in the art. The use of precast concrete wall panels has gained in popularity because they can be manufactured at a remote location, transported to a job site and attached into place, usually be welding steel embeds to a building's steel structural frame. Precast structural panels can also be formed both onsite and offsite and used to support a loadbearing structure of one to four stories tall. Precast concrete panels can be reinforced using standard deformed steel reinforcement (rebar) or stressed cables, such as pre-stressed or post tension cables. Generally these concrete panels are of a uniform thickness, the thickness of which is determined by the anticipated stresses to be placed upon the concrete panels or structure.

Prior art precast concrete wall panels also have a large thermal mass when exposed to ambient temperatures. They retain the heat in the summer or the cold in the winter very well. Therefore, buildings built with precast concrete panels generally have relatively poor energy efficiency. Such buildings usually require a relatively large amount of energy to keep them warm in the winter and cool in the summer. Since most precast concrete panels are not insulated, they must be insulated on the inside through the use of interior framing systems. This method however does not create a highly energy efficient building envelope. And, since batt insulation of significant thickness is required the interior frame system takes valuable floor space and creates a cavity wall.

More recently, new methods of insulating precast concrete panels have been employed. There are a number of insulated concrete panel systems currently employed. All of them are a "sandwich" type panel. Such panels require placing a layer of foam between two relatively thick layers of concrete. Some panels are non-composite while others are composite types. Regardless of which type is used, all concrete insulated sandwich panels are made of uniform concrete thickness on each respective side of the foam panel.

One method involves placing a layer of insulation between a structural concrete layer and an architectural or non-structural concrete layer during the casting of the panel and then erecting this entire non-composite construction as an exterior panel. While this method improves the insulating properties of a wall and therefore the energy efficiency of a building, it has several drawbacks. Instead of having one layer of concrete, the "sandwich" creates two; one that is structural with the larger thermal mass that faces the inside of the building and is insulated from the elements. The second layer of concrete is slightly thinner and placed on the exterior of the building; i.e., on the side of the panel opposite the insulated structural layer. Although the second layer is thinner than the first layer, it usually includes steel reinforcing bars ("rebar"). Rebar has to have a minimum embedment of 1½ inches from the exterior face of concrete and is usually placed in the center of the concrete. Therefore, the thinnest exterior concrete is still approximately 3 to 4 inches thick of uniform thickness of each respective layer. The second layer is therefore still relatively thick and heavy. The weight of the second layer added to the weight of the first layer makes the entire panel relatively heavy. The American Concrete Institute and industry practice requires that no shear forces be exerted by the first and second layers of the "sandwich" on the insulating layer. Therefore, a bond breaking layer is applied to the insulating layer so that neither the first nor the second layer will adhere thereto. Since there is no bond between the two layers of concrete and the foam, the ties used to connect the two concrete layers have to be engineered to resist the shear pressure from the weight of the second layer of concrete. Generally this is a costly system.

Other methods of sandwich panel construction involve a layer of foam between two wythes (layers) of concrete in a composite type assembly. The inner and outer wythes can be the same thickness or the inner wythe can be thicker while the outer wythe can be thinner. Some use composite plastic ties to hold the two wythes together while others use carbon fiber mesh. Some sandwich panels use pre-stressed cables to achieve the required strength while others use internal trusses. However these panels are heavier and therefore more expensive to manufacture. Since the exterior wythes are made from conventional concrete, they are still considerably thick due to minimum steel embedment code requirements. The thinner the concrete wythes, the more brittle they become which requires use of pre-stressed cable reinforcement or expensive carbon fiber reinforcements. To place the steel embedments, attachments and reinforcement, the thinnest practical concrete thickness is limited to approximately 2 to 3 inches of uniform thickness of each respective wythe.

Concrete structures and panels are used to provide the load bearing capacity and to carry the loads or stresses of the structure. Vertical panels or walls are used to carry the roof loads and the load of intermediate floors. Horizontal slabs are used to carry the live loads, such as furniture and occupants of a structure. To achieve these properties the concrete has to be reinforced with steel. Concrete structures and panels have to be designed to safely withstand various type of loads or stresses, such a dead loads, live loads, wind loads, and seismic loads within an appropriate amount of deflection. However some of these loads are not equally distributed along a structure or panel. For instance, on each side of an opening there are greater stresses than in the middle of a long span wall. Additionally, building corners have greater stresses than the middle of a building side wall. Certain elevated slab or roof elements are connected to the walls at certain locations thereby distributing a larger load in that specific area than another. At these locations additional steel is used to reinforce the concrete. However the overall thickness of a concrete panel or slab is generally determined by the maximum concrete thickness required in the areas of maximum stress. Therefore, a concrete panel's or slab's thickness is the same in areas of maximum stress as in the areas of minimal stress and consequently is of a uniform thickness. Also, since steel reinforcement has to be continuous, generally the type, size and amount of steel from the areas of maximum stress are carried over into the areas of minimal stress. This creates an unnecessary amount of concrete and steel used in the areas of minimal stress that is not needed. While this is a known factor, the limitation of construction practices makes it impractical and expensive to form concrete panels with various concrete thicknesses and varying steel reinforcement to accommodate the various stresses within a concrete panel or slab. In addition, the aesthetic appearance of a concrete panel with various structural reinforcing elements cast within may not be desirable.

Almost all precast, tilt-up and concrete slabs are made of concrete of uniform thickness throughout. The insulated concrete sandwiched panels mentioned above also have concrete slabs of uniform thickness throughout.

Precast concrete panels are also used to construct highway noise barriers. Concrete noise barriers are used to deflect noise away from the protected areas. Concrete panels cannot absorb noise; they only deflect it. It is know that foam panels can absorb sound. Some states have used foam panels for sound barriers. However the structural limitations of the foam panels make them prone to other shortcomings. Some states, such as Georgia, have discontinued the use of foam panels. Also, while concrete noise barriers may be longer lasting, they are heavy and have very limited architectural features.

Generally roof structures are built using a system of steel beams, steel roof joists and corrugated metal roof deck. To provide insulation to the roof, insulation board is attached to the metal deck using fasteners generally spaced 24 to 36 inches on center. A roof membrane is then attached to the foam board using an adhesive. In certain cases, the roof membrane is attached using fasteners. While such roof systems are very popular, they are highly susceptible to storm or wind damage.

To create a roof system that can withstand hurricane force winds, concrete is typically poured on top of the corrugated metal deck. Then, insulation is attached to the top of the concrete. In some cases lightweight concrete is poured on top of the metal deck. Since lightweight concrete is a better insulator than regular concrete, some projects will attach a roof membrane directly to the top of the concrete without any insulation. While this provides greater wind resistance, it is not a very energy efficient roof system.

The biggest drawback of any roofing system that uses poured concrete on a metal roof deck is that the metal deck acts like a pan and it collects moisture. Since concrete needs to be moisture cured in order to achieve its maximum strength, additional water may be sprayed onto the concrete. Furthermore, lightweight concrete has significant amounts of air pockets and types of aggregate that retain water. Due to weather and construction schedules, roof membranes are sometimes applied while there is still significant moisture in the concrete. This moisture retained by the concrete is therefore trapped between the metal deck on the bottom of the concrete and the roof membrane on the top. Due to weather cycles, this trapped moisture has nowhere to go but up thereby causing failure of the roof membrane with resulting potential severe damage to the interior of the building.

Due to the specific design limitations, precast insulated sandwich concrete panels are seldom if ever used for a roof deck.

Therefore, it would be desirable to provide a system for relatively easily and efficiently insulating precast concrete panels or other structures to achieve the highest energy efficiency possible. It would also be desirable to provide a precast concrete panel system that provides a concrete form for casting structural reinforcing elements within the precast cementitious-based or cementitious panel or slab. It would also be desirable to provide a concrete panel that uses reduced amounts of concrete and reinforcing steel compared to conventional concrete panels or slabs. It would also be desirable to provide a composite precast insulated concrete panel that is lighter and stronger than prior art panels so that it can have improved performance in any type of natural disaster. It would also be desirable to provide an insulated precast concrete roof deck that does not trap moisture in the roof system. It would be desirable that the insulated precast concrete roof panels have greater energy efficiency and wind load resistance.

It would also be desirable to have a highway noise barrier system made of composite precast insulated concrete panels that are both sound absorbing as well as sound reflective. It would be desirable that such highway noise barrier system panels have the option to integrally include a wide range of architectural finishes. It would also be desirable to provide an integrated architectural finished composite precast insulated concrete panel that can incorporate all necessary reinforcing elements required by localized stresses within the panel or slab. It would also be desirable that such panels efficiently integrate a wide variety and types of cladding, finish textures, colors, and patterns, such as concrete, plaster, stucco, stone, brick, tile and the like.

SUMMARY OF THE INVENTION

The present invention satisfies the foregoing needs by providing an improved concrete precast or tilt-up or slab construction system.

In one disclosed embodiment, the present invention comprises a product. The product comprises a foam insulating panel, the panel having a first primary surface and an opposite second primary surface, wherein the foam insulating panel defines at least one recessed channel in the first primary surface, the at least one recessed channel being sized and shaped to provide a mold for a structural reinforcing member. The product also comprises a concrete panel formed on the first primary surface and filling the at least one recessed channel so as to provide a structural reinforcing member for the concrete panel.

In another disclosed embodiment, the present invention comprises a product. The product comprises a concrete panel having a first primary surface and an opposite second primary surface and having at least two parallel reinforcing columns, beams or rib on the first primary surface that at least partially define a cavity therebetween. The product also comprises a layer of foam insulating material having a first primary surface and an opposite second primary surface, wherein the second primary surface of the foam insulating material contacts the at least two parallel reinforcing columns, beams or rib and fills the cavity therebetween. The product further comprises a layer of reinforcing material disposed on the first primary surface of the layer of foam insulating material.

In another disclosed embodiment, the present invention comprises a method of making a concrete structure. The method comprises preparing a horizontal form of a desired shape for a precast concrete structure, the form having a bottom. The method also comprises preparing at least a portion of the bottom of the form from a foam insulating material, wherein the foam insulating material defines at least one recessed channel sized and shaped so as to form at least one concrete structural reinforcing member in the precast concrete structure. The method further comprises placing plastic concrete on the first insulating material so that the plastic concrete fills the at least one recessed channel and forms a layer on the first insulating material, whereby the second portion of the elongate anchor member is embedded in the plastic concrete.

In another disclosed embodiment, the present invention comprises a method of making a concrete structure. The method comprises preparing a horizontal form of a desired shape for a precast concrete structure, the form having a bottom. The method also comprises preparing at least a portion of the bottom of the form from a foam insulating material having a first primary surface and a second opposite primary surface, the second primary surface of the foam insulating material defining at least one recessed channel sized and shaped so as to form at least one concrete structural reinforcing member in the precast concrete structure, a layer of reinforcing material disposed on the first primary surface. The method further comprises placing plastic concrete on the second primary surface of the foam insulating material so that the plastic concrete fills the at least one recessed channel and forms a layer on the foam insulating material.

In another disclosed embodiment, the present invention comprises a roofing system. The roofing system comprises a precast concrete panel having a first primary surface. The roofing system also comprises a layer of foam insulating material having a first primary surface and an opposite second primary surface, the second primary surface of the layer of foam insulating material attached to the first primary surface of the concrete panel and a layer of reinforcing material disposed on the first primary surface of the layer of foam insulating material. The invention further comprises an elongate anchor member penetrating the layer of foam such that a portion of the anchor member is embedded in the concrete panel and an enlarged portion of the anchor member captures a portion of the layer of reinforcing material between the enlarged portion and the layer of foam insulating material. The invention also comprises a roofing membrane disposed on and attached to the layer of reinforcing material.

In another disclosed embodiment, the present invention comprises a roofing system. The roofing system comprises a precast concrete panel having a first primary surface. The roofing system also comprises a layer of foam insulating material having a first primary surface and an opposite second primary surface, the second primary surface of the layer of foam insulating material attached to the first primary surface of the concrete panel and a layer of reinforcing material disposed on the first primary surface of the layer of foam insulating material. The invention further comprises an elongate anchor member penetrating the layer of foam such that a portion of the anchor member is embedded in the concrete panel and an enlarged portion of the anchor member captures a portion of the layer of reinforcing material between the enlarged portion and the layer of foam insulating material. The invention also comprises a layer of cementitious material on the layer of reinforcing material. The invention also comprises a roofing membrane disposed on and attached to the layer of cementitious material.

In another disclosed embodiment, the present invention comprises a roofing system. The roofing system comprises a precast concrete panel having a first primary surface. The roofing system also comprises a layer of foam insulating material having a first primary surface and an opposite second primary surface, the second primary surface of the layer of foam insulating material attached to the first primary surface of the concrete panel and a layer of reinforcing material disposed on the first primary surface of the layer of foam insulating material. The roofing system further comprises an elongate anchor member penetrating the layer of foam such that a portion of the anchor member is embedded in the concrete panel and an enlarged portion of the anchor member captures a portion of the layer of foam material between the enlarged portion and the concrete panel. The roofing system also comprises a roofing membrane disposed on and attached to the layer of foam insulating material.

In another disclosed embodiment, the present invention comprises a building structure. The building structure comprises a precast concrete panel having a first primary surface and a layer of foam insulating material having a first primary surface and an opposite second primary surface, the second primary surface of the layer of foam insulating material attached to the first primary surface of the concrete panel. The building structure also comprises a layer of reinforcing material disposed on the first primary surface of the layer of foam insulating material. The building structure further comprises an elongate anchor member penetrating the layer of foam such that a portion of the anchor member is embedded in the concrete panel and an enlarged portion of the anchor member captures a portion of the layer of reinforcing material between the enlarged portion and the layer of foam insulating material. The building structure also comprises a layer of cementitious material disposed on the layer of reinforcing material. The building structure further comprises a pair of vertical columns horizontally spaced from each other, whereby the precast concrete panel is attached to the pair of vertical columns such that the precast concrete panel is disposed vertically.

Accordingly, it is an object of the present invention to provide an improved insulated concrete tilt-up construction system.

Another object of the present invention is to provide an improved insulated precast concrete panel or slab system.

Another object of the present invention is to provide an improved insulated reinforced concrete panel system.

Another object of the present invention is to provide an improved insulated concrete panel system that incorporates various structural reinforcing elements of different thickness in the areas of maximum stress and uses less concrete and reinforcing steel in the areas of minimal stress.

A further object of this present invention is to provide a method of constructing a highly energy efficient building envelope.

Another object of the present invention is to provide an improved method for making a concrete structure.

A further object of the present invention is to provide an improved form for an insulated precast or concrete tilt-up panel that can form various structural reinforcing elements of different thickness in the areas of maximum stress and uses less concrete and reinforcing steel in the areas of minimal stress.

Another object of the present invention is to provide an improved insulated precast concrete panel.

Another object of the present invention is to provide a precast concrete panel whereby the expansion and contraction due to the temperature changes is significantly reduced, or eliminated, thereby reducing the internal stress in the curing concrete thereby reducing the amount of reinforcement necessary within the panel.

A further object of the present invention is to provide a tilt-up concrete panel whereby the expansion and contraction due to the temperature changes is significantly reduced or eliminated, thereby reducing the internal stress in the curing concrete thereby increasing the useful life span of the structure.

Another object of the present invention is to provide a precast concrete panel with a system for attaching a wide variety of wall claddings thereto.

Yet another object of the present invention is to provide a precast tilt up concrete systems that can be cast on any level, solid surface.

A further object of this present invention is to eliminate the bond formed between the concrete panels and the casting surface, thereby reducing the amount of force required to break such a bond and thereby reducing the size of the lifting equipment required to lift the panels by making a lighter panel by using less concrete and reinforced steel.

Still another object of the present invention is to provide a tilt-up insulated concrete panel with a system for applying decorative finishes to the insulated surface thereof.

Another object of the present invention is to provide a tilt-up concrete forming system that allows the tilt-up concrete panel to be erected more quickly than prior art systems.

Another object of the present invention is to provide an improved precast concrete construction system.

Another object of the present inventions is to provide an improved insulated precast system that can be cast on prestressed cable tables of any length and then cut to size in the desired lengths.

Another object of the present invention is to provide more sustainable and environmentally friendly concrete construction system that uses less raw materials and energy.

A further object of the present invention is to provide an improved roofing system.

Another object of the present invention is to provide an improved sound abatement structure.

These and other objects, features and advantages of the present invention will become apparent after a review of the following detailed description of the disclosed embodiments and the appended drawing and claims.

BRIEF DESCRIPTION OF THE DRAWINGS

FIG. 2 is a cross-sectional view taken along the line 2-2 of the insulated concrete form shown in FIG. 1 shown without the layer of insulating material.

FIG. 3 is a cross-sectional view taken along the line 3-3 of the insulated concrete form shown in FIG. 1 shown without the layer of insulating material.

FIG. 8 is a cross-sectional view of a concrete form shown for a concrete panel in accordance with the present invention shown with an exterior coating on the foam insulating panel and optional side form members.

FIG. 9 is a cross-sectional view of a concrete form shown for a concrete panel in accordance with the present invention shown with an exterior coating on the foam insulating panel and optional side form members.

DETAILED DESCRIPTION OF THE DISCLOSED EMBODIMENTS

U.S. patent application Ser. No. 13/247,256 filed Sep. 28, 2011 and Ser. No. 13/626,087 filed Sep. 25, 2012 are both incorporated herein by reference in their entirety.

Figure 1:
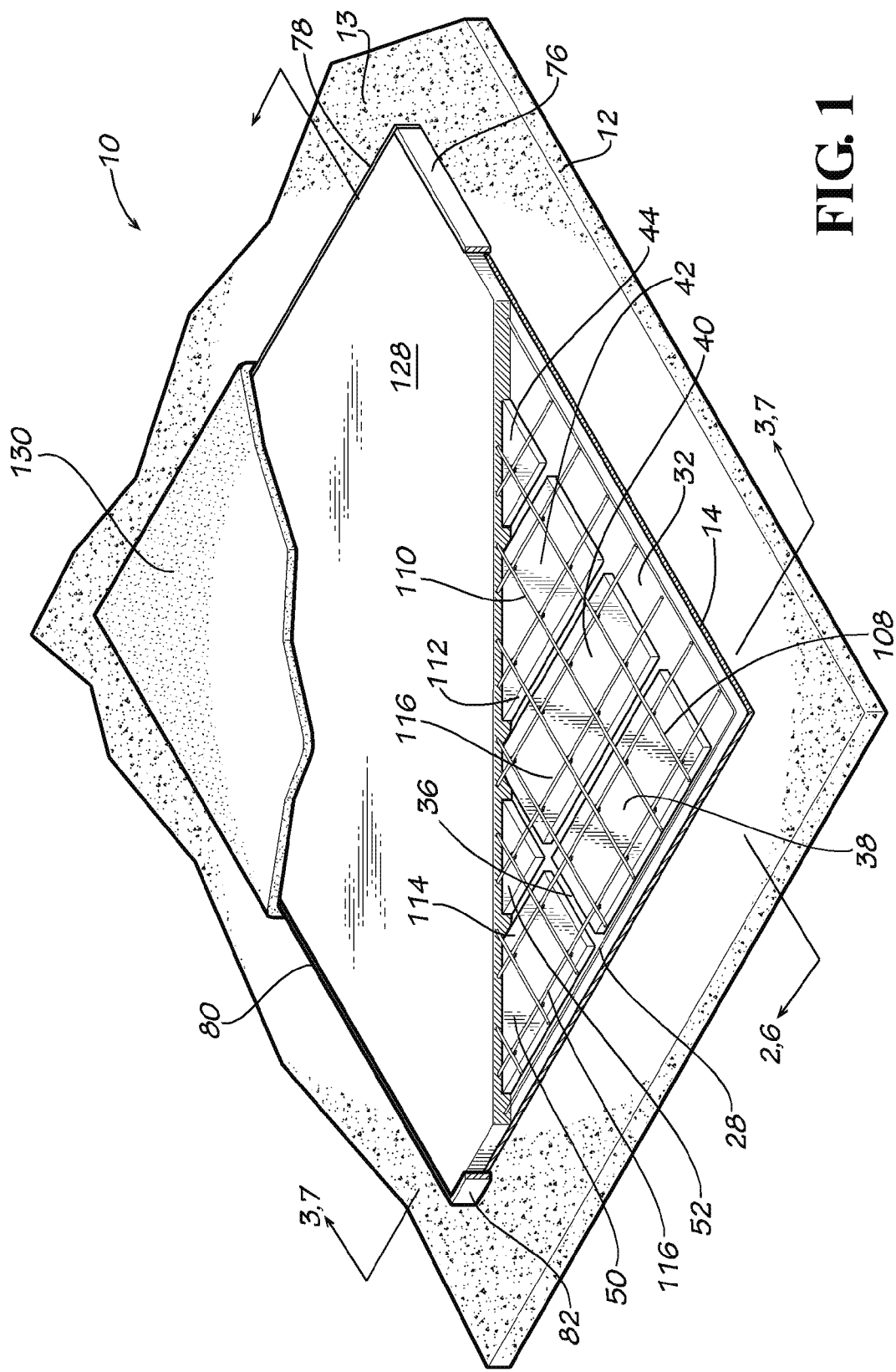
FIG. 1 is a partially cutaway perspective view of a disclosed embodiment of an insulated concrete form for a precast or tilt-up composite insulated concrete panel in accordance with the present invention. Some of the rebar has been eliminated from FIG. 1 for clarity.

Referring now to the drawing in which like numbers indicate like elements throughout the several views, there is shown in FIG. 1 a disclosed embodiment of a precast or tilt-up concrete form 10 in accordance with the present invention. The insulated concrete form 10 rests horizontally on a previously formed, and at least partially cured, concrete slab 12, which forms a floor of a proposed building (not shown). Alternately, the concrete form 10 can be used on any solid, level, casting surface, such as a casting table for making precast concrete panels or also vertically in a precast battery mold. In certain cases, the concrete form 10 can be used to form an elevated slab in the manner disclosed in applicant's co-pending patent application Ser. No. 13/247,133 filed Sep. 28, 2011 (the disclosure of which is incorporated herein by reference in its entirety). The concrete slab 12 has a horizontal flat upper surface 13. The insulated concrete form 10 includes a rectangular foam insulating panel 14. The foam insulating panel 14 can be made from a single piece of foam or from multiple pieces of foam joined together, as described in U.S. patent application Ser. No. 13/247,256 filed Sep. 28, 2011 and Ser. No. 13/626,087 filed Sep. 25, 2012 (the disclosures of which are incorporated herein by reference in their entirety). In this disclosed embodiment, the foam insulating panel 14 is 20 feet tall and 40 feet wide. This is a size of a concrete panel that may be used for building a two-story high warehouse building, such as a home building supply store or a warehouse grocery store/general merchandise store, single family home residence or any multistory building construction. Of course, any size concrete panel or slab can be constructed in accordance with the present invention by using foam insulating panels of different sizes or a larger or smaller number of such panels. When pre-stressed cables are used for internal reinforcement, the concrete form can be 200 to 600 feet long by 12 to 15 wide. In such case multiple panels can be cast at once as a continuous panel and then cut to the desired length.

The foam insulating panel 14 can be made from any insulating material that is sufficiently rigid to withstand the pressures of the concrete placed in the form and from workers walking on the foam insulating panel. The foam insulating panel 14 preferably is made from a polymeric foam material, such as molded expanded polystyrene or extruded expanded polystyrene. Other polymeric foams can also be used, such as polyisocyanurate or polyurethane. The foam insulating panels should also have a density sufficient to make them substantially rigid, such as approximately 1 to approximately 3 pounds per cubic foot, preferably approximately 1.5 pounds per cubic foot. Expanded polystyrene is available under the trademark Neopor® and is available from Georgia Foam, Gainesville, Ga., USA. Extruded polystyrene is available from Dow Chemicals of Midland, Mich., USA. The foam insulating panel 14 can be made by molding to the desired size and shape, by cutting blocks or sheets of pre-formed extruded expanded polystyrene foam into a desired size and shape or by extruding the desired shape and then cutting to the desired length. Any number of foam insulating panels can be joined together to provide a form bottom of a dimension equal to the desired height of the concrete panel being formed. If the foam insulating panel 14 is made from polystyrene or from a material other than polystyrene, the foam insulating panel should have minimum insulating properties equivalent to approximately 0.5 to approximately 8 inches of expanded polystyrene foam; more preferably at least 0.5 inches of expanded polystyrene foam; most preferably at least 1 inch of expanded polystyrene foam; especially at least 2 inches of expanded polystyrene foam; more especially at least 3 inches of expanded polystyrene foam; most especially, at least 4 inches of expanded polystyrene foam. Preferably, the foam insulating panel 14 has insulating properties equivalent about 0.5 inches of expanded polystyrene foam; about 1 inch of expanded polystyrene foam; about 2 inches of expanded polystyrene foam; about 3 inches of expanded polystyrene foam; or about 4 inches of expanded polystyrene foam.

Figure 16:
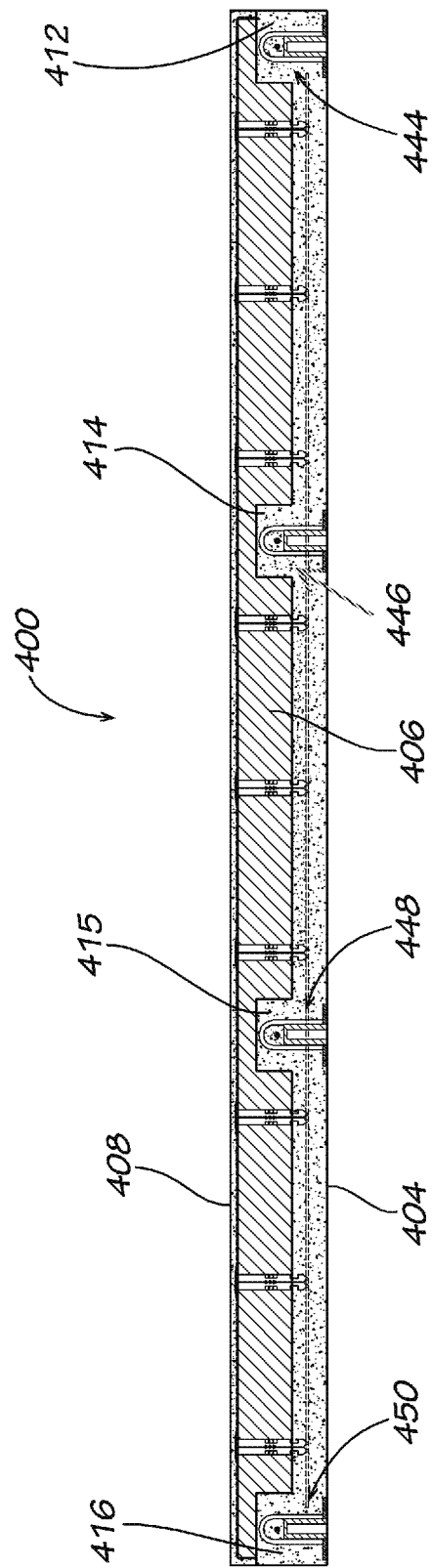
FIG. 16 is a cross-sectional view taken along the line 16-16 of the reinforced insulated concrete panel shown in FIG. 15.
Figure 17:
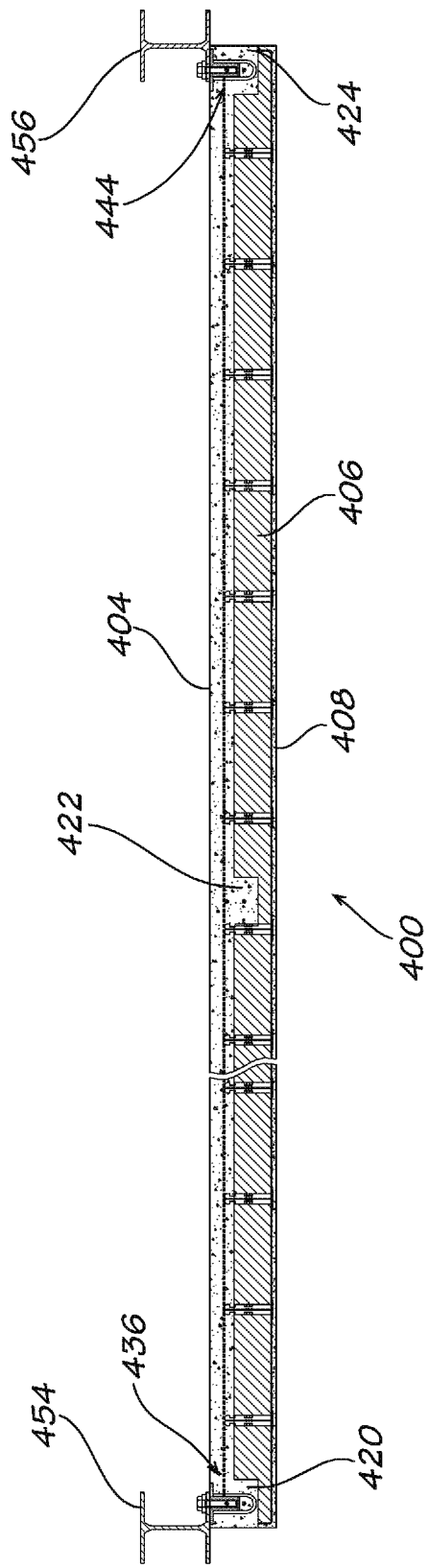
FIG. 17 is a cross-sectional view taken along the line 17-17 of the reinforced insulated concrete panel shown in FIG. 15.
Figure 18:
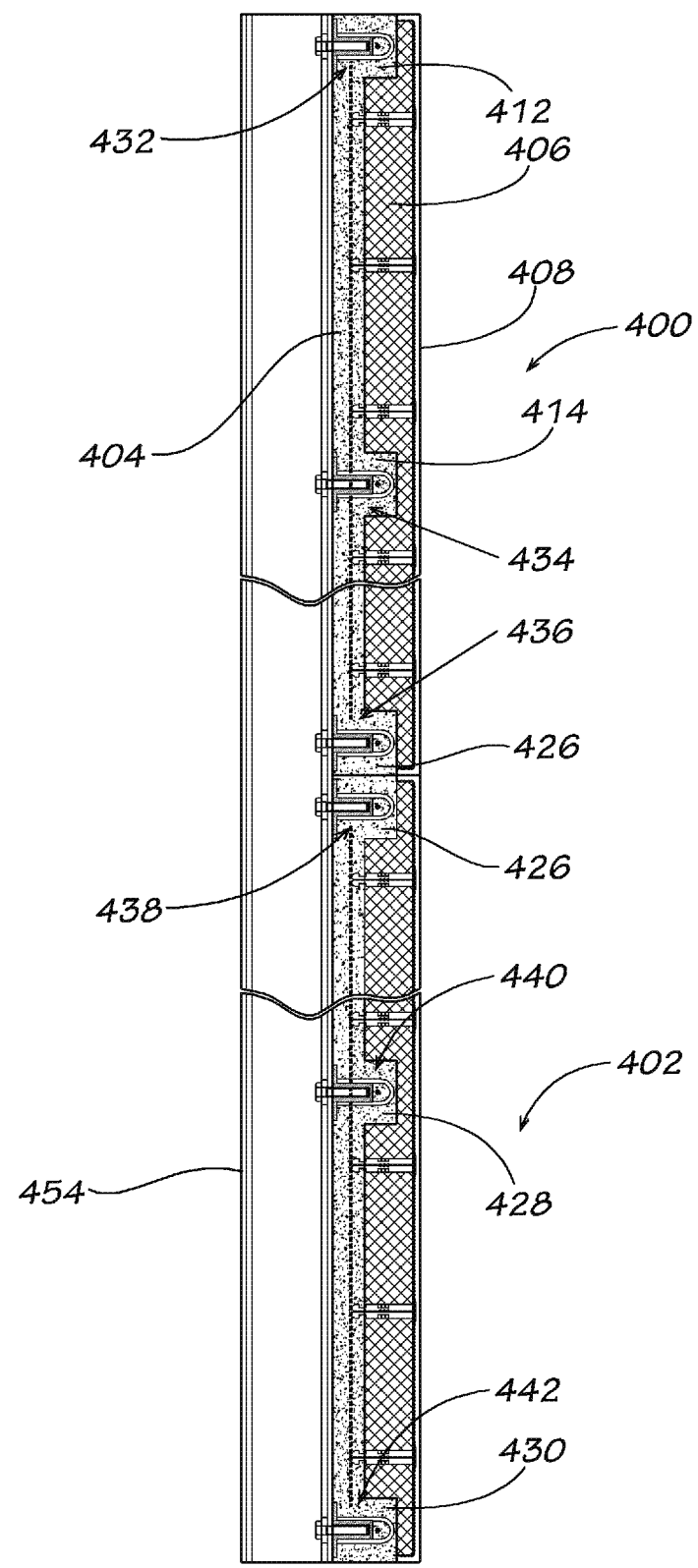
FIG. 18 is a cross-sectional view taken along the line 18-18 of the reinforced insulated concrete panel shown in FIG. 15.

Optionally, applied to the lower (i.e., bottom) surface of the foam insulating panel 14 is a layer of reinforcing material 16 (FIG. 16), as disclosed in applicant's co-pending patent application Ser. No. 12/753,220 filed Apr. 2, 2010; Ser. No. 13/247,133 filed Sep. 28, 2011; Ser. No. 13/247,256 filed Sep. 28, 2011; and Ser. No. 13/626,087 filed Sep. 25, 2012 (all of which are incorporated herein by reference in their entirety). The layer of reinforcing material 16 can be made from continuous materials, such as sheets or films, or discontinuous materials, such as fabrics, webs or meshes. The layer of reinforcing material 16 can be made from materials such as polymers, for example polyethylene or polypropylene, from fibers, such as fiberglass, basalt fibers, aramid fibers or from composite materials, such as carbon fibers in polymeric materials, or from metal sheets, such as steel or aluminum sheets or corrugated sheets, and foils, such as metal foils, especially aluminum foil. The layer of reinforcing material 16 can be adhered to the outer surfaces (i.e., the bottom surface when the panel is in a horizontal position or the exterior surface when the panel is in a vertical position) of the foam insulating panel 14 by a conventional adhesive. However, it is preferred that the layer of reinforcing material 16 be laminated to the lower surface of the foam insulating panel 14 using a polymeric material that also forms a weather or moisture barrier on the exterior surface of the foam insulating panel. The weather barrier can be applied to the layer of reinforcing material 16 on the surface of the foam insulating panel 14 by any suitable method, such as by spraying, brushing or rolling. The moisture barrier can be applied as the laminating agent for the layer of reinforcing material 16 or it can be applied in addition to an adhesive used to adhere the layer of reinforcing material to the outer surface of the foam insulating panel 14. Suitable polymeric materials for use as the moisture barrier are any water-proof polymeric material that is compatible with both the material from which the layer of reinforcing material 16 and the foam insulating panel 14 are made; especially, liquid applied weather membrane materials. Useful liquid applied weather membrane materials include, but are not limited to, WeatherSeal® by Parex of Anaheim, Calif. (a 100% acrylic elastomeric waterproof membrane and air barrier which can be applied by rolling, brushing, or spraying) or Senershield® by BASF (a one-component fluid-applied vapor impermeable air/water-resistive barrier that is both waterproof and resilient) available at most building supply stores. For relatively simple application, where cost is an issue or where simple exterior finish systems are desired, the layer of reinforcing material 16 can be omitted.

A preferred elastomeric weather membrane is a combination of WeatherSeal® and 0.1% to approximately 50% by weight ceramic fibers, preferably 0.1% to 40% by weight, more preferably 0.1% to 30% by weight, most preferably 0.1% to 20% by weight, especially 0.1% to 15% by weight, more especially 0.1% to 10% by weight, most especially 0.1% to 5% by weight. Ceramic fibers are fibers made from materials including, but not limited to, silica, silicon carbide, alumina, aluminum silicate, aluminum oxide, zirconia, and calcium silicate. Wollastonite is an example of a ceramic fiber. Wollastonite is a calcium inosilicate mineral ($CaSiO_3$) that may contain small amounts of iron, magnesium, and manganese substituted for calcium. Wollastonite is available from NYCO Minerals of NY, USA. Bulk ceramic fibers are available from Unifrax I LLC, Niagara Falls, N.Y., USA. Ceramic fibers are known to block heat transmission and especially radiant heat. When placed on the exterior surface of a wall, ceramic fibers improve the energy efficiency of the building envelope.

Optionally, Wollastonite can be used in the elastomeric weather membrane to both increase resistance to heat transmission and act as a fire retardant. Therefore, the elastomeric weather membrane can obtain fire resistance properties. A fire resistant membrane over the exterior face of the foam insulating panel can increase the fire rating of the wall assembly by delaying the melting of the foam.

The foam insulating panel 14 includes at least one, and preferably a plurality of recessed transverse channels, such as the channels 18-26, that extend the full width of the foam insulating panel. On the tranverse peripheral edges of the foam insulating panel 14 are transverse half-channels 28, 30 that extend the full width of the foam insulating panel. On the longitudinal peripheral edges of the foam insulating panel 14 are longitudinal half-channels 32, 34 that extend the full length of the foam insulating panel. The half channels 28-34 are so designated because they define a bottom and one side of the channel; the opposite side of the channel is defined by the form side members discussed below. Intermediate the longitudinal half-channels 32-34 is a longitudinal channel 36 that extend the full length of the foam insulating panel 14. Intermediate the channels 18-26 and the half-channels 28-30 and between the channel 36 and half-channels 32-34 are elevated islands 38-48 and 50-52 (only two of six are shown).

The channels 18-26, 36 and half-channels 28-34 can be of any suitable cross-sectional shape, such as circular, oval, V-shaped, dovetail and the like, but in this disclosed embodiment are rectangular in cross-section. The channels 18-26 and half channels 28, 30 are parallel to and equally spaced from each other. Similarly, the channel 36 and half-channels 32, 34 are parallel to and equally spaced from each other. Of course, depending on design citeria, such as panel size, anticipated wind loads and the like, other number, spacing and/or arrangement of the channels and half-channels can be used. For example, if a window, a door or other opening is to be included in the precast panel, it may be necessary to frame such members with corresponding channels in the foam insulating panel 14, which therefore creates a concrete beam, column or structural reinforcing rib which reinforces the panel around and opening for the door or window. The foam insulating panel 14 can be made by casting in the desired shape and size or by cutting the channels 18-26, 36 and half-channels 28-34 into a sheet of foam of the desired dimensions, such as by cutting with a knife, a saw, a router, or a hot knife. Alternatively, the islands 28-48 can be cut to the desired dimension and then adhesively attached to a foam panel of uniform thickness, thereby defining the channels 18-26, 36 and half-channels 28-34 therebetween.

The foam insulating panel 14 includes a plurality of panel anchor members, such as the panel anchor member 54. Each panel anchor member 54 is preferably formed from a polymeric material, such as polyethylene, polypropylene, nylon, glass filled thermoplastics, thermosetting plastics or the like. For particularly large or heavy structures, the panel anchor member 54 is preferably formed from glass filled nylon. The panel anchor member 54 can be formed by any suitable process, such as by injection molding or pultrusion. The panel anchor member 54 can also be made from metal, such as by casting, stamping and other suitable processes. The design of the panel anchor member 54 is disclosed in more detail in applicant's co-pending patent application Ser. No. 13/626,087 filed Sep. 25, 2012 (the disclosure of which is incorporated herein by reference in its entirety). Alternative designs for the panel anchor member are disclosed in applicant's co-pending patent application Ser. No. 13/247,133 filed Sep. 28, 2011; Ser. No. 13/247,256 filed Sep. 28, 2011 and Ser. No. 13/626,087 filed Sep. 25, 2012 and in applicant's co-pending patent application entitled "Hybrid Insulated Concrete Form and Method of Making and Using Same" filed contemporaneously herewith (the disclosures of which are all incorporated herein by reference in their entirety). Any one of these designs for the panel anchor member can be used in the present invention.

Figure 5:
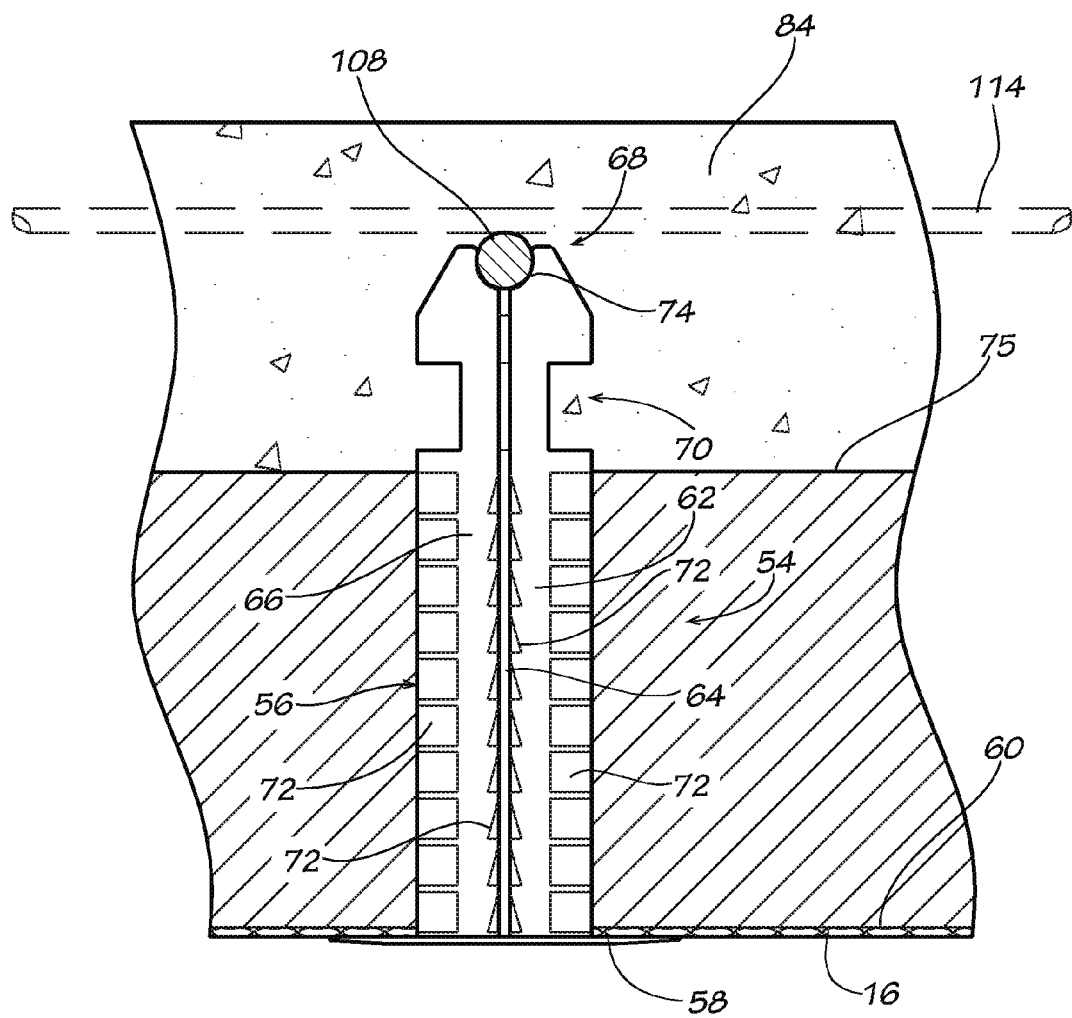
FIG. 5 is a partial detailed view of the insulated concrete form shown in FIG. 4.

Each panel anchor member 54 includes an elongate panel-penetrating portion 56 and an integral flange 58 that extends radially outwardly from an end of the panel-penetrating portion. The flange 58 can be any suitable shape, such as square, oval or the like, but in this embodiment is shown as circular. The layer of reinforcing material 16 and flange 58 are disposed such that at least a portion of the layer of reinforcing material is disposed between the exterior surface 60 the foam insulating panel and the flange of the panel anchor member 54, thereby attaching the layer of reinforcing material to the foam insulating panel. The panel-penetrating portion 56 can be any suitable cross-sectional shape, such as square, round, oval or the like, but in this embodiment is shown as having a generally plus sign ("+") cross-sectional shape. The panel-penetrating portion 56 comprises four leg members 62, 64, 66 (only three of the four legs are visible in FIG. 5) extending radially outwardly from a central core member. The plus sign ("+") cross-sectional shape of the panel-penetrating portion 56 prevents the panel anchor member 54 from rotating around its longitudinal axis during concrete placement. Formed adjacent an end 68 of the panel anchor member 54 opposite the flange 58 is a notch 70. The notch 70 is formed in each of the four legs 62-66 adjacent the end 68 of the panel anchor member 54. The notch 70 can be any shape, such as triangular, round, oval or the like, but in this embodiment is shown as having a generally rectangular shape (FIG. 5). Once plastic concrete is poured, the notch 70 will capture a sufficient amount of concrete so that the anchor member 54 is solidly embedded in the concrete. The notch 70 provides a portion of the panel anchor member 54 having an effective reduced diameter or dimension relative to the effective diameter or dimension of the four legs 62-64. Or, viewed another way, the four legs 62-64 adjacent the end 68 have an effective larger diameter than the effective diameter of the notch 70.

On each of the four legs 62-66 intermediate the flange 58 and the notch 70 are a plurality of fins 72 projecting outwardly from each of the legs. The fins 72 can be any suitable shape, such as round, but in this embodiment are shown as generally rectangular and flaring outwardly from the legs 62-66 toward the flange 58. The fins 72 help retain the panel anchor member 54 after it is inserted in the foam insulating panel 14. This prevents the panel anchor member 54 from falling out of the foam insulating panel 14 during transportation and setup.

The legs 62, 66 includes a U-shaped cutout 74 adjacent the end 68 of the panel anchor member 54. The U-shaped cutout 74 is designed and adapted to receive and hold a thin or small gauge rebar or wire mesh for reinforcing the structural concrete. The notch 74 is formed so that it can hold reinforcing steel in place and at a desired position within the concrete panel for optimal steel reinforcement placement. Of course, in addition to the use of rebar, or in place of the use of rebar, reinforcing fibers, such as steel fibers, synthetic fibers or mineral fibers, such as Wollastonite, can be used. Many different types of steel fibers are known and can be used in the present invention, such as those disclosed in U.S. Pat. Nos. 6,235,108; 7,419,543 and 7,641,731 and PCT patent application International Publication Nos. WO 2012/080326 and WO 2012/080323 (the disclosures of which are incorporated herein by reference in their entireties). Particularly preferred steel fibers are Dramix® 3D, 4D and 5D steel fibers available from Bekaert, Belgium and Bekaert Corp., Marietta, Ga., USA. Plastic fibers can also be used, such as those disclosed in U.S. Pat. Nos. 6,753,081; 6,569,525 and 5,628,822 (the disclosures of which are incorporated herein by reference in their entireties).

The foam insulating panel 14 is prepared by forming a plurality of holes in the foam insulating panel to receive the ends, such as the end 68 of the panel penetrating portion 56, of a plurality of panel anchor members identical to the panel anchor member 54. Holes (not shown) in the composite foam insulating panel 14 can be formed by conventional drilling, such as with a rotating drill bit, by water jets, by hot knives or by a saw knife. When the composite foam insulating panel 14 includes a layer of reinforcing material 16 the layer of reinforcing material is preferably adhered to the composite foam insulating panel before the holes are formed in the panel. It is also preferable to form the holes in the composite foam insulating panel 14 after the moisture barrier is applied to the bottom surface (or exterior surface) of the composite foam insulating panel. First, round holes are formed through the thickness of the foam insulating panel 14 extending from the upper surface 75 to the bottom surface 60. The inner diameter of the holes is equal to the outer diameter of the central round core of the panel anchor member 54 so as to form a tight fit when the panel-penetrating portion 56 is inserted into each hole. Then, slots (not shown) radiating outwardly from the initial hole and spaced circumferentially 90 degrees from each other are drilled in the composite foam insulating panel 14 to accommodate the four legs 62-66 of the panel anchor member 54 and to form a tight fit therewith. Alternately, a hole matching the cross-sectional shape of the end 68 of the panel anchor member 54, including the central round core and the legs, can be formed in the composite foam insulating panel 14 using a hot knife or a saw knife. The holes formed in the composite foam insulating panel 14 extend from the bottom surface 60 to the upper surface 75, respectively, of the composite foam insulating panel so that the foam panel penetrating portion 56 of the panel anchor member 54 can be inserted complete through the composite foam insulating panel, as shown in FIG. 5.

The foam insulating panel 14 is assembled by inserting the foam panel penetrating portion 56 of the panel anchor member 54 through the hole (not shown) in the foam insulating panel 14, until the flange 58 contacts the bottom surface 60 of the foam insulating panel and is flush with the bottom surface 60 of the foam insulating panel (FIG. 5) or is flush with the layer of reinforcing layer 16, if present. It should be noted that when the layer of reinforcing material 16 is used on the bottom surface of the foam insulating panel 14, the layer of reinforcing material is captured between the flange 58 of the panel anchor member 54 and the bottom surface 60 of the foam insulating panel 14 (see for example FIG. 5).

As shown in FIGS. 1-4, a plurality panel anchor members identical to the panel anchor member 54 are positioned in spaced rows and columns across the width and height of the foam insulating panel 14 (see FIGS. 2 and 3). In the embodiment disclosed herein, the panel anchor members are spaced on 24 inch centers.

The panel anchor members, such as the panel anchor member 54, are used to attach the foam insulating panel 14 to the concrete panel that will be cast in the concrete form 10 on the top surface 75 of the foam insulating panel. The panel anchor members, such as the panel anchor 54, are also used to optionally attach cladding systems to the exterior surface of the foam insulating panel 14. The panel anchor member 54 also captures the layer of reinforcing material 16 between the flange 48 and the exterior surface 60 of the foam insulating panel 14. The diameter of the flange 58 should therefore be as large as practical to maintain the panel anchor member 54 in a vertical position when rebar is attached to the panel anchor member, as described below, when plastic concrete is placed in the form and to capture as much of the layer of reinforcing material 16 between the flange 58 and the exterior surface 60 of the foam insulating panel 14. It is found as a part of the present invention that a flange 58 having a diameter of approximately 2 to 4 inches, especially approximately 3 inches, is useful in the present invention. The diameter of the flange 58 should therefore be as large as practical to support the anticipated weight of the cladding material that will be attached to the panel anchor member 54. Furthermore, the spacing between adjacent panel anchor members will vary depending on factors including the type of cladding that may optionally be attached to the panel anchor members 54. However, depending on the desired type of exterior wall cladding, it is found as a part of the present invention that a spacing of adjacent panel anchor members 54 of approximately 6 inch to 24 inch centers is useful in the present invention. By adhesively attaching the layer of reinforcing material 16 to the exterior surface 60 of the foam insulating panel 14, by capturing at least a portion of the layer of reinforcing material between the flange 58 and the exterior surface 60 of the foam insulating panel and by embedding at least a portion of the panel penetrating portion 56 of the panel anchor member 54 in cured concrete, the range of exterior cladding materials that can be attached to the layer of reinforcing material is greatly expended and includes, but is not limited to, concrete, plaster, mortar, stucco, stone, brick, thin brick, tile and the like.

Figure 4:
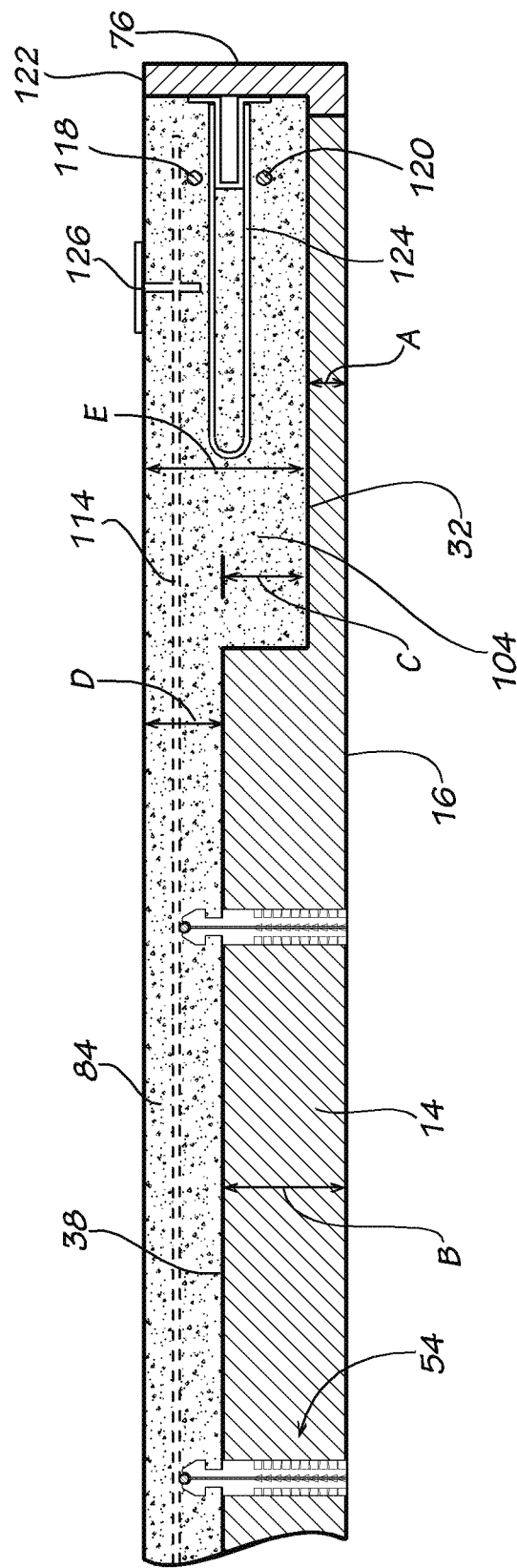
FIG. 4 is a partial detailed view of the insulated concrete form shown in FIG. 3.

The thickness of the foam insulating panel 14 is also a factor that must be considered in designing the precast concrete panel in accordance with the present invention and will vary depending on factors including the amount of insulation desired, the thickness of the concrete panel, the thickness of the structural reinforcing elements and the dimensions of the concrete panel. However, the thickness of the foam insulating panel is not uniform. The foam insulating panel 14 has a thickness "A" at the channels 18-26, 36 and the half-channels 28-34 and a thickness "B" at the elevated islands 38-48 and 50-52 (FIG. 4). The difference in the thickness of the foam insulating panel at "A" and at "B" is designated as "C" (FIG. 4). The thicknesses at both "A" and "B" can be varied independently depending on design criteria of the thickness of the reinforcing element and the desired amount of minimum insulation at the thickness "A". There is no maximum thickness for the foam insulating panel 14 that can be used in the present invention. The maximum thickness is only dictated by economics and/or ease of handing. However, it is found as a part of the present invention that the thickness for the foam insulating panel 14 at "A" should not be less than 1 inch, preferably not be less than 1.5 inches, more preferably not less than 3 inches, especially approximately 1.5 inches to approximately 12 inches. The thickness of the foam insulating panel 14 at "A" is preferably approximately 1.5 inches, more preferably approximately 3 inches, most preferably approximately 4 inches, especially approximately 5 inches, more especially approximately 6 inches. The thickness for the foam insulating panel 14 at "B" preferably should not be less than 2 inches, more preferably not less than 3 inches, most preferably not less than 4 inches, especially not less than 5 inches, more especially not less than 6 inches, most especially approximately 3 inches to approximately 12 inches. The thickness of the foam insulating panel 14 at "B" is approximately 2 inches, preferably approximately 3 inches, more preferably approximately 4 inches, most preferably approximately 5 inches, especially approximately 6 inches, more especially approximately 7 inches, most especially approximately 8 inches.

Use of the present invention will now be considered. It is anticipated that the foam insulating panel 14 with the panel anchor members 54 installed in it will be preassembled at a remote location and transported to a job site. Also, in many cases the foam insulating panel 14 is precut and predrilled at a factory and then delivered to a job site with or without the layer of reinforcing material 16 on the foam insulating panel. Then, all panel anchor members 54 can be installed in the foam insulating panel 14 on site. In another embodiment the precast concrete panels can be cast at a precast plant where all of the above can be assembled on a casting table, in a battery mold, in a form with pre-tensioned steel cables or any other suitable surface. The foam insulating panel 14 is then place on a flat horizontal surface, such as on the flat surface 13 of the concrete slab 12. The foam insulating panel 14 forms a bottom surface, or at least a portion of the bottom surface, of the insulated concrete form 10 and has the exact desired dimensions of the finished concrete panel, which in this case is illustrated as being 20 feet by 40 feet, except for an optional small offset at the peripheral edges (See FIG. 5).

After the foam insulating panel 14 is positioned as shown in FIG. 1, a conventional wood or metal form is constructed around the peripheral edges of the foam insulating panel. Specifically, as shown in FIGS. 1, 2 and 3, a longitudinal side form member 76 is disposed against the right longitudinal edge of the foam insulating panel 14. A transverse side form member 78 is disposed against the upper lateral edge of the foam insulating panel 14. A longitudinal side form member 80 is disposed against the left longitudinal exterior edge of the foam insulating panel 14. And, a transverse side form member 82 is disposed against the lower lateral edge of the foam insulating panel 14. The side form members 76-82 are joined together in a manner well known in the art. Although this embodiment has been disclosed as positioning the foam insulating panel 14 and then constructing the side frame members 76-82, the present invention also contemplates constructing the side form members first and then placing the foam insulating panel 14 within the side frame members. If the side frame members 76-82 are constructed first, it may be necessary to trim the foam insulating panel 14 to fit. This can easily be done with a saw, a knife blade or preferably with a hot knife.

As can be seen in FIGS. 1-4, when plastic concrete 84 is placed on the foam insulating panel 14, it fills the channels 18-26, 36 and half-channels 28-34 and forms a layer of uniform thickness above the elevated islands 38-48 and 50-52. However, since the concrete is thicker where the channels 18-26, 36 and half-channels 28-34 are formed, that thicker concrete then becomes a structural reinforcing element, such as a column, beam or rib. For example, as shown in FIGS. 2-4, a transverse peripheral structural reinforcing element, such as a column 86, is formed in the cavity defined by the half channel 28 and the side form member 82. Similarly, a longitudinal peripheral structural reinforcing element, such as a beam 88, is formed in the cavity defined by the half channel 34 and the side form member 80. Additionally, five transverse structural reinforcing elements, such as columns 90, 92, 94, 96, 98, are formed in the channels 18-26 (FIG. 2) and a longitudinal central structural reinforcing element, such as a beam 100, is formed in the channel 36 (FIG. 3). Furthermore, a transverse peripheral structural reinforcing element, such as a column 102, is formed in the cavity defined by the half channel 30 and the side form member 78 (FIG. 2). Similarly, a longitudinal peripheral structural reinforcing member, such as a column 104, is formed in the cavity defined by the half channel 32 and the side form member 76 (FIG. 3).

As shown in FIGS. 2-4, the thickness of the concrete 84 is not uniform. The concrete 84 has a thickness "D" at the elevated islands 38-48 and 50-52 and a thickness "E" at the channels 18-26, 36 and half-channels 28-34. The height of the side form members 76-82 is selected such that it is equal to the thickness of the foam insulating panel 14 at the half channels 28-34; i.e., thickness "A", plus the desired thickness of the beams 88, 100, 104 and columns 86, 90-98, 102; i.e., thickness "E". For example, if the foam insulating panel 14 is three inches thick ("A") at the channels 18-26, 36 and half-channels 28-34 and the thickness of the beams 88, 100, 104 and columns 86, 90-98, 102 is six inches ("E"), the side form members 76-82 will be nine inches high. With these dimensions, the thickness of the concrete above the elevated islands 38-48 and 50-52 is three inches ("D"). The thicknesses of these different portions of the precast concrete panel can be adjusted by changing the difference ("C") in the thickness of the foam insulating panel 14 at the channels 18-26, 36 and half-channels 28-34 and at the elevated islands 38-48 and 50-52. Further adjustments can be made by changing the thickness ("D") of the concrete 84 above the elevated islands 38-48 and 50-52.

The channels in the foam insulating panel 14, such as the channels 18-26, 36 and half-channels 28-34, are sized (for width and thickness) and shaped to provide structural reinforcement to the finished concrete panel or slab so that it has improved strength against deflection during raising of the panel to a vertical position and against anticipated wind loads or other loads. Specifically, channels are provided in the foam insulating panel 14 so as to provide structural reinforcing elements, such as columns, beams or ribs, at the panel locations where the maximum loads and stresses are located, such as around the periphery of the concrete panel and/or where roof trusses or floor slab connections may be located. In the embodiment shown, such peripheral structural reinforcing columns, beams or ribs comprise the columns 86, 102 and the beams 88, 104. It is also preferred that the concrete panel include at least one intermediate horizontal reinforcing beams, such as the beam 100, to minimize lateral deflection and improve load bearing capacity and any other desired structural property. The size and the shape of the reinforcing columns, beams and ribs are dictated by the structural requirements of individual panel designs based upon the anticipated loads and stresses. However, the reinforcing columns, beams or ribs are preferably at least 25% thicker than the portion of the concrete panel between the reinforcing columns, beams or ribs; i.e., the thickness "E" is at least 25% thicker than the thickness "D"; preferably at least 50% thicker, more preferably at least 75% thicker, most preferably at least 100% thicker. The width of the reinforcing columns, beams or ribs are dictated by design requirements. However, the reinforcing columns, beams or ribs are at least 4 inches wide, preferably at least 6 inches wide, more preferably at least 8 inches wide, most preferably at least 10 inches wide.

As stated above, each of the panel anchor members, such as the panel anchor member 54, includes a U-shaped portion 74 extending upwardly adjacent the end 68. The U-shaped portion 74 is sized and shaped as a rebar chair to receive and retain an elongate round steel rebar, such as the rebar 108 or wire mesh. The U-shaped portion 74 has a degree of resilience to it so that the rebar 108 can be pushed or laid into the U-shaped portion and the U-shaped portion will hold the rebar with sufficient force such that the rebar will not be easily dislodged from the U-shaped portion when plastic concrete 84 is poured into the concrete form 10 and on top of the horizontal foam insulating panel 14. The U-shaped portion 74 of the panel anchor member 54 is aligned with the other U-shaped portions of the other panel anchor members in the same row of panel anchor members, so that the same piece of rebar 108 or wire mesh can be attached to the U-shaped portions of the other panel anchor members (see FIG. 1). Thus, aligned rows of panel anchor members 54 provide aligned rows of U-shaped portions 74, such that additional rows of rebar parallel to the rebar 108, such as the rebar 110, 112, of a desired length can be attached to the rows of panel anchor members. Crossing columns of rebar, such as the rebar 114, 116, are laid on top of the rows of rebar, such as the rebar 108-112 to form a conventional rebar grid. Where the columns and rows of rebar intersect, such as the rebar 108 and the rebar 114 (FIGS. 1 and 5), the rebar can be tied together with wire or plastic ties (not shown) in any conventional manner known in the art. The panel anchor members, such as the panel anchor member 54, are designed such that the distance from the flange 58 to the U-shaped portion 74 positions the rebar, such as the rebar 108, at approximately the mid-point of the thickness of the concrete above the elevated islands 38-48 and 50-52 or at any other specified distance or point from the exterior concrete surface. Thus, the panel anchor members 54 will automatically position the rebar grid at the proper depth for the precast concrete panel being constructed, as required by structural design calculations. Of course additional rebar, such as the rebar 118, 120 (FIG. 4), can be included in the beams 88, 100, 104 and columns 86, 90-98, 102 to provide additional reinforcement as design requirements may require for the maximum stresses or loads anticipated at such locations.

After the rebar grid, such as the rebar 108-120, or wire mesh is constructed in the insulated concrete form 10, the form is filled with plastic concrete 84. Sufficient plastic concrete 84 is placed in the form such that the plastic concrete in the form reaches the top 122 of the side form members 76-82. Embeds and/or inserts are attached to the edge or the face of any of the structural reinforcement elements, such as the side forms member 76-82 or to the rebar grid, as needed or desired. The inserts can be threaded or have connection hooks, loops or any other attachment type well known in the art. Such inserts are used for raising the panel from a horizontal position to a vertical position, for loading onto a flat bed track, or for hoisting the panel into place, such as for high-rise building exterior concrete panels. The type, size and placement of such embeds and/or inserts are not important to the present invention and are determined by design calculation or other design criteria. Especially useful is that in multistory construction, threaded inserts can be placed at spaced interval in the longitudinal intermediate structural member 100 for attachment of an intermediate floor system (not shown). Likewise inserts can be attached to the face of the structural members 88 or 104 or to the edge thereof for roof truss connections and the like. Especially useful is that the inserts are located at the intersection of the longitudinal and the transversal (vertical and horizontal) structural reinforcing elements in such a way as to most effectively distribute the stress and loads within the structure. For example, FIG. 4 shows a female threaded insert with a reinforcement loop 124 in the concrete and an embedment 126. The top surface 128 of the plastic concrete 84 is then finished in any desired conventional manner, such as by troweling, or to provide other types of architectural finishes or patterns.

Figure 6:
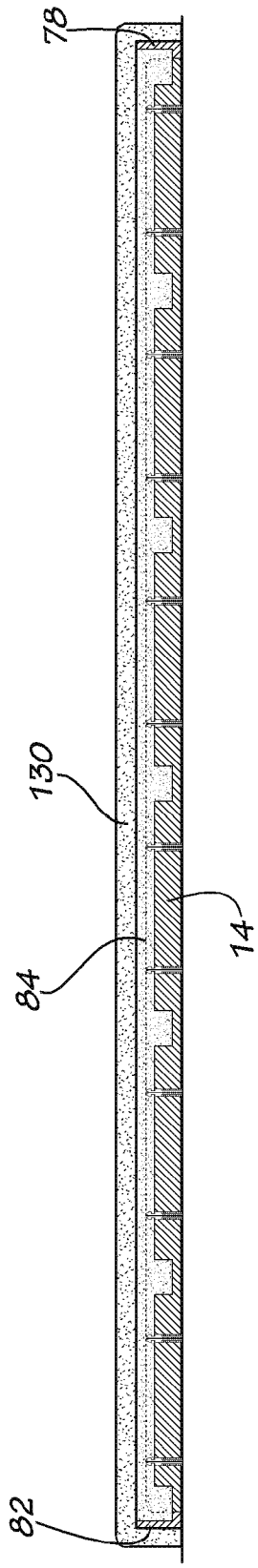
FIG. 6 is a cross-sectional view taken along the line 6-6 of the insulated concrete form shown in FIG. 1 showing a disclosed embodiment of a layer of insulating material on top of the insulated concrete form.
Figure 7:
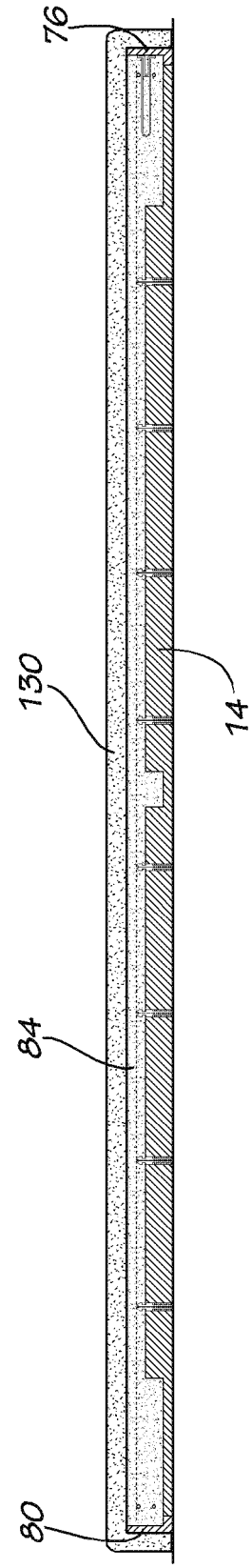
FIG. 7 is a cross-sectional view taken along the line 7-7 of the insulated concrete form shown in FIG. 1 showing a disclosed embodiment of a layer of insulating material on top of the insulated concrete form.

After the plastic concrete 84 in the form 10 has been finished, a layer of insulating material 130 optionally is placed on the top 122 of the side form members 76-82 and the top surface 128 of the finished plastic concrete 84, as shown in FIGS. 1, 6 and 7. The layer of insulating material 130 can be made from the same material as the foam insulating panel 14 that forms the bottom of the concrete form 10. However, the layer of insulating material 130 is preferably a concrete insulating blanket or an electrically heated concrete blanket. If the layer of insulating material 130 is made from polystyrene, it preferably is at least 0.5 inches thick; more preferably at least 1 inch thick, especially at least 2 inches thick; more especially at least 3 inches thick; most especially, at least 4 inches thick. If the layer of insulating material 120 is made from expanded polystyrene foam, it preferably is approximately 0.5 inches thick; preferably approximately 1 inch thick; more preferably approximately 2 inches thick; especially approximately 3 inches thick; most especially approximately 4 inches thick. If the layer of insulating material 120 is made from a material other than polystyrene, it should have insulating properties equivalent to at least 0.5 inches of expanded polystyrene foam; preferably approximately 1 inch to approximately 8 inches of expanded polystyrene foam; more preferably at least 1 inch of expanded polystyrene foam; especially at least 2 inches of expanded polystyrene foam; more especially at least 3 inches of expanded polystyrene foam; most especially, at least 4 inches of expanded polystyrene foam. If the layer of insulating material 120 is made from a material other than expanded polystyrene foam, it should have insulating properties equivalent to approximately 0.5 inch thick of expanded polystyrene; approximately 1 inch thick; preferably approximately 2 inches thick; especially approximately 3 inches thick; most especially approximately 4 inches thick. Expanded polystyrene foam has an R-value of approximately 4 to 5 per inch thickness. Therefore, the layer of insulating material 120 should have an R-value of greater than 1.5, greater than 4, preferably greater than 10, more preferably greater than 15, especially greater than 20. The layer of insulating material 120 preferably has an R-value of approximately 5 to approximately 40; more preferably between approximately 10 to approximately 40; especially approximately 15 to approximately 40; more especially approximately 20 to approximately 40. The layer of insulating material 120 preferably has an R-value of approximately 5, more preferably approximately 10, especially approximately 15, most preferably approximately 20.

The objective of the present invention is to insulate the plastic concrete 84 within the form 10 as completely as possible; i.e., on all sides. As can be seen in FIGS. 6 and 7, the plastic concrete 84 in the concrete form 10 is insulated on both the top, the bottom and on all sides. Thus, the plastic concrete 84 in the form 10 is completely encased or surrounded in insulating material by the bottom foam insulating panel 14 and on the top and the sides by the layer of insulating material 130.

When the layer of insulating material 130 is a concrete insulating blanket or an electrically heated concrete blanket, it is draped over the top surface 128 of the plastic concrete 84, the tops 122 of the side form members 76-82 and down the sides of the form; i.e., around the side form members and down to the surface 13 of the concrete slab 12. Again, the objective is to completely surround the plastic concrete 84 with insulating material.

A concrete insulating blanket is typically made from a tarp material filled with polyethylene or polypropylene foam. Suitable concrete insulating blankets are commercially available under the designation Micro Foam from Pregis, Lake Forest, Ill. The concrete insulating blanket can also be an electrically heated concrete insulating blanket. Such electrically heated concrete insulating blankets have been used in highway construction in the northern United States to prevent plastic concrete from freezing in winter weather or to thaw frozen ground. Suitable electrically heated concrete insulating blankets are commercially available under the designation Powerblanket from Power Blanket LLC, Salt Lake City, Utah Concrete insulating blankets have advantages over the use of foam insulating panels, such as the foam insulating panel 14, in that the concrete insulating blankets are flexible and can be rolled up for easier transportation. An electrically heated concrete insulating blanket also has the advantage to being able to provide additional heat to the curing concrete in order to accelerate the curing or maturing process. The concrete insulating blanket (or the electrically heated concrete insulating blanket) should have insulating properties equivalent to the layer of insulating material 130 as set forth above.

If the layer of insulating material 130 is an electrically heated concrete blanket or an electrically heated concrete form, it should be designed and operated in the same manner as the electrically heated blanket or the electrically heated concrete form disclosed in applicant's co-pending patent application Ser. No. 13/626,075 filed Sep. 25, 2012 (the disclosure of which is incorporated herein by reference in its entirety). Thus, if an electrically heated concrete blanket or an electrically heated concrete form is used for the layer of insulating material 130, the concrete 84 is preferably cured according to a predetermined temperature profile, in the manner disclosed in applicant's co-pending patent application Ser. No. 13/626,075 filed Sep. 25, 2012 (the disclosure of which is incorporated herein by reference in its entirety).

The layer of insulating material 130 can also be made from a refractory insulating material, such as a refractory blanket or a refractory board. Refractory insulating material is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, and fireclay. Refractory insulating material is commercially available in bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. The refractory insulating material can be any thickness that provides the desired insulating properties, as set forth above. There is no upper limit on the thickness of the refractory insulating material; this is usually dictated by economics and/or ease of handling. However, refractory insulating material useful in the present invention can range from $1/64$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, or epoxy, and used as a coating to create a refractory insulating material layer, for example covering, or substantially covering, one of the primary surfaces of a form or mold, such as a battery mold, for the insulated concrete panel of the present invention. Ceramic fibers in a polymer binder or foam are commercially available as Super Therm®, Epoxotherm and HPC Coating from Superior Products, II, Inc., Weston, Fla., USA. Alternatively, the top insulating material 130 can be a panel made of two reinforcing sheets (not shown) held together by a compound made of ceramic fibers suspended in a polymer binder or foam.

Of course, for certain applications, it may be desirable to omit the use of the layer of insulating material 130 on the top and sides of the form; i.e., omit the use of the top and side foam insulating panels or the use of the concrete insulating blanket (or the electrically heated concrete insulating blanket). In other situations, it may be desirable to place a concrete insulating blanket or an electrically heated concrete insulating blanket on top of the top and side foam insulating panels, if used for the layer of insulating material 130.

The uncured concrete 84 is kept in the form 10 for a time sufficient for the concrete to achieve sufficient strength, such as sufficient compressive strength, so that the partially cured concrete panel can be moved or raised without breaking, suffering structural damage or cracking. The time necessary for the uncured concrete 84 to achieve a desired amount or degree of cure will vary depending on many factors, including the type of concrete mix used, ambient temperatures, thickness of the concrete, and the like. However, the uncured concrete 84 will generally achieve sufficient strength within approximately four hours to seven days. By using the layer of insulating material 130 (or electrically heated insulating blanket or electrically heated concrete form) in accordance with the present invention, the uncured concrete 84 in the form 10 will cure faster and will achieve early strength more quickly than prior art systems. The layer of insulating material 130 (or electrically heated insulating blanket or electrically heated concrete form) in accordance with the present invention also results in less plastic concrete shrinkage, thereby reducing cracking of the finished concrete. These benefits make the precast concrete panel in accordance with the present invention stronger and allow the panel to be moved or raised earlier than prior art systems. By retaining the water in the concrete mix within the concrete form 10 and since that space is insulated by the layer of insulating material 130 and the foam insulating panel 14, the heat of hydration of the curing concrete is retained within the insulated concrete form and sufficient water is present such that the concrete will achieve its maximum potential strength faster, thereby producing stronger concrete (in terms of both early strength and ultimate strength).

After the uncured concrete 84 has achieved a desired amount or degree of cure, the insulating material 130 is removed, if present, and the side form members 76-82 are removed (FIGS. 8-10), thus leaving a reinforced concrete panel 200 (FIG. 11) and an integrally attached foam insulating panel 14. Since the concrete 84 is at lease partially cured, the panel anchor members, such as the panel anchor members 54, are securely anchored in the concrete panel 200. The foam insulating panel 14 is therefore mechanically attached to the concrete panel 200 by the panel anchors members 54 and by an adhesive bond between the foam insulating panel 14 and the concrete 84; i.e., as the uncured concrete cures, it forms a strong adhesive bond with the foam insulating panel. Thus, the concrete panel 200 is both mechanically attached to the foam insulating panel 14 by the panel anchor members 54 and physically attached by the adhesive bond of the concrete across the entire surface of the foam insulating panel. This large surface area provides a substantial and strong connection between the foam insulating panel 14 and the concrete panel 200.

Precast plants make use of steam curing rooms. In one disclosed embodiment, the insulating material 130 can be kept in place for only a sufficient amount of time for the concrete to achieve the necessary amount of hardness before it can be stripped from the form or mold and the concrete panel and attached foam insulating panel moved into a conventional steam curing room. Since there is no bond between the bottom of the foam panel and the casting surface (table) it rests on, the concrete panel can be easily moved and stored on shelves in a steam curing room until it has achieved the necessary hydration and strength. Since only the side form elements have to be stripped from the entire concrete assembly, it can easily be moved on a conveyor belt system from the casting area into the steam curing area. The casting and curing area can be efficiently integrated with a conveyor, delivery and steam curing storage area.

Figure 10:
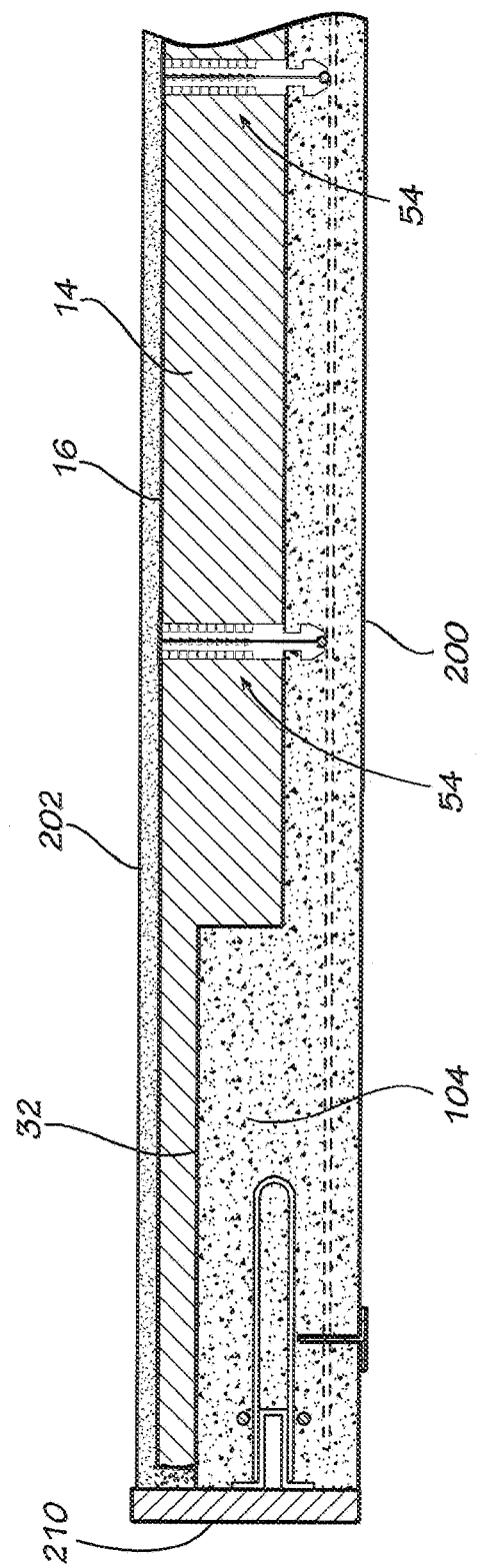
FIG. 10 is a partial detailed view of the composite insulated concrete panel shown in FIG. 9.

After the concrete panel 200 has achieved a desired amount or degree of cure, an exterior non-structural (i.e., decorative) architectural layer 202 can be applied to the surface of the foam insulating panel 14 opposite the concrete panel; i.e., on the layer of reinforcing material 16, if present (FIG. 10). The exterior architectural layer 202 can be applied, for example at a manufacturing facility or it can be applied after the concrete panel 200 and attached foam insulating panel 14 are erected to a vertical position at a job site and attached to a building structure or other structure (not shown).

The exterior architectural layer 202 can be applied by any suitable means, such as by spraying, hand troweling, dry casting, wet casting or by extrusion to the necessary thickness, depending on the material and the thickness of the exterior decorative layer. The exterior architectural layer 202 can be made of conventional concrete, mortar, stucco, synthetic stucco, plaster or any other cementitious material, cementitious polymer modified material or polymer coatings. A particularly preferred exterior architectural layer 202 is a layer of polymer modified cementitious material, such as polymer modified concrete, polymer modified plaster or polymer modified mortar, with decorative aggregate only partially embedded into the layer of polymer modified plaster. The decorative aggregate particles can be any decorative and/or colorful stone, semi-precious stone, quartz, granite, basalt, marble, stone pebbles, glass or shells. The decorative aggregate particles can be made from stone including, but not limited to, amethyst, azul bahia, azul macaubas, foxite, glimmer, honey onyx, green onyx, sodalite, green jade, pink quartz, white quartz, and orange calcite. The decorative aggregate particles can be made from crushed glass including, but not limited to, recycled clear glass, recycled mirror glass, recycled clear plate glass, recycled cobalt blue glass, recycled mixed plate glass, and recycled black glass. The decorative aggregate particles can be made from recycled aggregate including, but not limited to, recycled amber, recycled concrete and recycled porcelain. The decorative aggregate particles can be made from non-recycled glass including, but not limited to, artificially colored glass, reflective glass, transparent glass, opaque glass, frosted glass and coated glass. The decorative aggregate particles can be made from tumbled glass including, but not limited to, jelly bean and glass beads. Decorative aggregate can be obtained from Arim Inc., Teaneck, N.J., USA. The decorative aggregate particles can be any suitable size, but preferably are size #000 (passes mesh 16, retained on mesh 25) to size #3 (½ inch to ⅜ inch), more preferably size #00 (passes mesh 10, retained mesh 16) to size #2 (⅜ inch to ¼ inch) and most preferably size #00 (passes mesh 10, retained mesh 16) to size #1 (¼ inch to ⅛ inch). The decorative aggregate particles preferably have irregular, random shapes. However, for certain applications it may be desirable for the aggregate particles to have uniform shapes, such as are obtained by tumbling the aggregate, for example jelly bean shaped or bead shaped. The decorative aggregate can be parially embedded in the layer of polymer modified cementitious material by any suitable method, such as by boadcasting into the layer of polymer modified cementitious material followed by pushing the decorative aggregate particles partially into the layer of polymer modified cementitious material by using a roller. However, the layer of decorative aggregate is preferably formed in the layer of polymer modified cementitious material by blowing decorative aggregate particles into the layer of polymer modified cementitious material using compressed air. After blowing the decorative aggregate particles into the layer of polymer modified cementitious material if additional embedment of the decorative aggregate particles in the layer of polymer modified cementitious material is necessary, the decorative aggregate particles can be pushed partially into the layer of polymer modified cementitious material by using a roller.

The exterior architectural layer 202 can be sprayed or have an integrated color pigment and/or it can have any type of architectural texture or color finish. To provide greater flexural strength and impact resistance, a particularly preferred material for the exterior architectural layer 202 is polymer modified concrete, polymer modified cement plaster, polymer modified geopolymer or polymer modified mortar. Polymer modified concrete, polymer modified cement plaster, polymer modified geopolymer or polymer modified mortar is known in the art and comprises a conventional concrete, plaster, geopolymer or mortar mix to which a polymer is added in a polymer-to-cement ratio of 0.1% to 50% by weight, preferably 0.1% to 25% by weight, more preferably approximately 1% to 25% by weight, most preferably approximately 5% to approximately 20% by weight. Polymer modified concrete can be made using the polymer amounts shown above in any of the concrete formulations shown below. Polymers suitable for addition to concrete, plaster or mortar mixes come in many different types: thermoplastic polymers, thermosetting polymers, elastomeric polymers, latex polymers and redispersible polymer powders. A preferred thermoplastic polymer is an acrylic polymer. Latex polymers can be classified as thermoplastic polymers or elastomeric polymers. Latex thermoplastic polymers include, but are not limited to, poly(styrene-butyl acrylate); vinyl acetate-type copolymers; e.g., poly(ethyl-vinyl acetate) (EVA); polyacrylic ester (PAE); polyvinyl acetate (PVAC); and polyvinylidene chloride (PVDC). Latex elastomeric polymers include, but are not limited to, styrene-butadiene rubber (SBR); nitrile butadiene rubber (NBR); natural rubber (NR); polychloroprene rubber (CR) or Neoprene; polyvinyl alcohol; and methyl cellulose. Redispersible polymer powders can also be classified as thermoplastic polymers or elastomeric polymers. Redispersible thermoplastic polymer powders include, but are not limited to, polyacrylic ester (PAE); e.g., poly(methyl methacrylate-butyl acrylate); poly(styrene-acrylic ester) (SAE); poly(vinyl acetate-vinyl versatate) (VA/VeoVa); and poly(ethylene-vinyl acetate) (EVA). Redispersible elastomeric polymer powders include, but are not limited to, styrene-butadiene rubber (SBR). Preferred polymers for modifying the concrete, plaster or mortar mixes of the present invention are polycarboxylates. A particularly preferred polymer modified concrete, plaster or mortar for use as the exterior architectural layer 202 is disclosed in U.S. Pat. No. 7,714,058 (the disclosure of which is incorporated herein by reference in its entirety). Geopolymers are generally formed by reaction of an aluminosilicate powder with an alkaline silicate solution at roughly ambient conditions. Metakaolin is a commonly used starting material for synthesis of geopolymers, and is generated by thermal activation of kaolinite clay. Geopolymers can also be made from sources of pozzolanic materials, such as lava, fly ash from coal, slag, rice husk ash and combinations thereof.

It is specifically contemplated that the cementitious-based material from which the exterior architectural layer 202 is made can include reinforcing fibers made from material including, but not limited to, steel, plastic polymers, glass, basalt, Wollastonite, carbon, and the like. The use of reinforcing fiber in the exterior architectural layer 202 made from polymer modified concrete, polymer modified mortar or polymer modified plaster provide the layer of cementitous material with improved flexural strength, as well as improved impact resistance and blast resistance.

Wollastonite can be used in the exterior architectural layer 202 to increase compressive and flexural strength as well as impact resistance. Also, Wollastonite can improve resistance to heat transmission and add fire resistance to the exterior plaster. Therefore the coating can obtain fire resistance properties as well as improved energy efficiency properties. A fire resistant material over the exterior face of the foam can increase the fire rating of the wall assembly by delaying the melting of the foam. Increased resistance to heat transmission will also increase the building energy efficiency and therefore lower energy cost, such as heating and cooling expenses.

For a relatively thin and strong exterior architectural layer 202 made from relatively light material, such as a polymer, for example an acrylic polymer base coat; polymer modified concrete; cement plaster; geopolymer or mortar, the exterior coating can be applied with the composite panel in a vertical orientation. This can be done by raising the concrete panel 200 and attached foam insulating panel 14 to a vertical orientation. The exterior architectural layer 202 can then be applied to the exterior surface of the foam insulating panel 14 and the layer of reinforcing material 16, if present, by any suitable method, such as by spraying, by hand troweling or by extrusion. For example, a polymer, for example an acrylic polymer base coat; polymer modified concrete; cement plaster; geopolymer or mortar is applied to the exterior surface of the foam insulating panel 14 and the layer of reinforcing material 16, if present, by spraying to a desired thickness, such as approximately 1/16 inch to approximately 2 inches; preferably approximately 1/16 inch, approximately 1/8, preferably approximately 1/4 inch, preferably approximately 0.5 inches, preferably approximately 0.75 inches, preferably approximately 1 inch, preferably approximately 1.25 inches, preferably approximately 1.5 inches, preferably approximately 1.75 inches and preferably approximately 2 inches. The exterior architectural layer 202 is more preferably approximately 1/16 inch to approximately 1 inch. The polymer modified concrete, cement plaster, geopolymer or mortar is preferably applied to the exterior surface of the foam insulating panel 14 and the layer of reinforcing material 16, if present, by extrusion to a desired thickness, preferably approximately 1/8 inch to approximately 1.75 inches. Other suitable coatings for use as the thin exterior architectural layer 202 include, but are not limited to, a cementitious or an acrylic EIFS base coat, such as Parex 121 base coat mixed with portland cement (or dry bag version); a 100% acrylic polymer base coat, such as Parex ABC-N1 base coat; a color integrated acrylic finish coat, such as Parex DPR acrylic finish coat; a multicolor finish made of colored beads mixed with a clear polymer binder, such as Parex Cerastone or any type of finish coating, such as Parex Specialty finishes.

The sprayed or extruded polymer, polymer modified concrete, cement plaster, polymer modified cement plaster, geopolymer or mortar on the foam insulating panel 14 and the layer of reinforcing material 16, if present, is then smoothed with a hand trowel to form an even, smooth surface for the exterior architectural layer 202 or left in it's natural extruded state or sprayed texture. The exterior architectural layer 202 is then allowed to cure sufficiently so that the concrete panel 200 can be moved without causing cracking or damage to the exterior decorative layer. If acceleration of the curing process is desired or needed, the exterior architectural layer 202 is wrapped with a layer of insulating material, such as using the layer of insulating material 130 in the same manner as described above for the plastic concrete 84. Alternatively, the exterior architectural layer 202 is enclosed by an electrically heated concrete blanket or by an electrically heated concrete form and the exterior coating is cured according to a predetermined temperature profile, in the manner disclosed in applicant's co-pending patent application Ser. No. 13/626,075 filed Sep. 25, 2012 (the disclosure of which is incorporated herein by reference in its entirety). Similarly, the entire assembly; i.e., concrete panel 200, foam insulating panel 14 and exterior architectural layer 202, can be placed inside a steam curing room, as previously described.

If a thicker and/or heavier layer or material is used for the exterior architectural layer 202, the concrete panel 200 is then inverted from the position shown in FIGS. 1-4 to the position shown in FIGS. 9-10, so that the concrete panel 200 is resting on the casting surface 13 and the layer of reinforcing material 16, if present, is facing upward, as shown in FIG. 10. The concrete panel 200 is inverted using techniques and apparatus that are well known in the art. The exterior architectural layer 202 can then be applied to the foam insulating panel 14 and layer of reinforcing material 16, if present, in the same manner as described above for the plastic concrete 84. Side form members 204, 206, 208, 210 can be used, if necessary.

Use of polymer modified concrete, polymer modified cement plaster, geopolymer or mortar for the exterior architectural layer 202 withstands far greater flexural stresses, and it eliminates the internal reinforcing and pre-stressed cables associated with other types of sandwich panels. Yet another benefit of using a polymer modified concrete, polymer modified cement plaster, polymer modified stucco, polymer modified geopolymer or polymer modified mortar is the alkalinity of the cementitious material is reduced compared to conventional concrete which allows for use of lath and meshes made from various mineral or synthetic fibers as reinforcement for the exterior architectural layer 202. All of the foregoing effectively reduces the thickness of the exterior architectural layer 202 to a minimum possible thickness, as required by specific applications and budgets.

The thickness of the exterior architectural layer 202 is substantially thinner than the concrete panel 200 at its thinnest portion; i.e., at "D". The exterior architectural layer 202 is less than 50% of the thickness of the concrete panel 200; preferably, less than 25% of the thickness of the concrete panel; more preferably, less than 10% of the thickness of the concrete panel; most preferably, less than 5% of the thickness of the concrete panel at its thinnest portion. Since the exterior architectural layer 202 is much thinner than the concrete panel 200, the overall weight of the composite panel of the present invention is much less than conventional concrete panels. It also eliminates the need for strong ties between the interior and exterior wythes, such as required in the prior art T-Mass and the Carboncast concrete panels. By using a relatively thin, lightweight layer for the exterior architectural layer 202, a bond breaker between the foam insulating panel 14 and the concrete panel 200 is not required. In fact, it is specifically contemplated as a part of the present invention that an adhesive bond is formed between the concrete panel 200 and the foam insulating panel 14 and between the exterior architectural layer 202 and the foam insulating panel. Also, the bond between the concrete panel 200 and the foam insulating panel 14 and the exterior architectural layer 202 and the foam insulating panel, in conjunction with the mechanical connection provided by the panel anchor members 54 and the layer of reinforcing material 16 create a much stronger composite insulated concrete panel and yet more flexible to certain deflection. Furthermore, since the exterior architectural layer 202 is so thin, the exterior thermal mass is relatively small which makes the overall energy efficiency of the composite insulated concrete panel of the present invention far greater than prior art concrete panels.

The exterior architectural layer 202 is kept in the form (if cast) for a time sufficient for the concrete to achieve a desired amount of cure. If the exterior architectural layer 202 is sprayed, hand troweled or extruded, then no form is necessary. When sprayed, hand troweled or extruded, the concrete panel 200 can be horizontal or vertical depending on available space and preference. If other types of materials are used, such as polymer modified concrete, polymer modified cement plaster, polymer modified stucco, acrylic base coat and finishes, geopolymer or mortar or polymers, there may be no need to keep the material under the layer of insulating material 130. The time necessary for the polymer modified concrete, polymer modified cement plaster, polymer modified geopolymer or polymer modified mortar of the exterior architectural layer 202 to achieve a desired amount or degree of cure will vary depending on many factors, including the material used, the type of concrete mix used, ambient temperatures, thickness of the exterior coating, and the like. However, the exterior architectural layer 202 will generally achieve sufficient strength within approximately one hour to seven days. By using the layer of insulating material 130 (or the electrically heated insulating blanket or electrically heated form) in accordance with the present invention, the concrete, plaster or mortar in the form will set faster and hydrate faster and will achieve early concrete, plaster or mortar strength more quickly than prior art systems. The electrically heated blanket or electrically heated form in accordance with the present invention also results in less plastic concrete, plaster or mortar shrinkage, thereby reducing cracking of the finished concrete, plaster or mortar. Using a steam curing room has a similar effect on the curing of the polymer modified concrete, cement plaster, geopolymer or mortar as any of the other enhanced curing systems and methods mentioned above. These benefits make the precast concrete panel in accordance with the present invention stronger and allow the panel to be used earlier than prior art systems. By retaining the water in the concrete mix within the insulated concrete form and since that space is insulated by the foam insulating panel 14 and layer of insulating material 130, the heat of hydration is retained within the insulated concrete form such that the concrete, plaster or mortar mix of the exterior architectural layer 202 will achieve its maximum potential strength and rigidity earlier and faster, thereby producing a stronger concrete panel.

Figure 11:
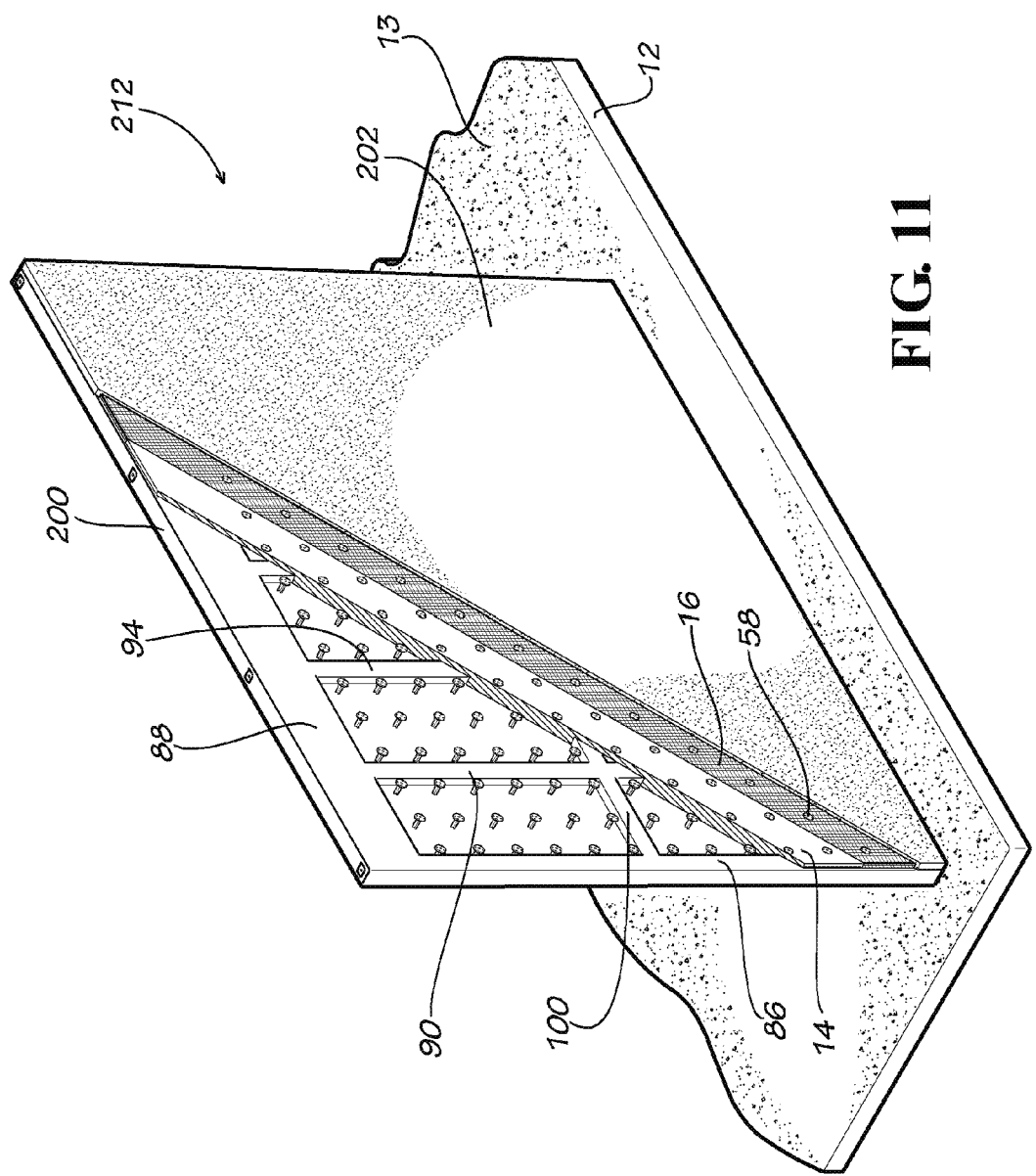
FIG. 11 is a partially cut away perspective view of a disclosed embodiment of a composite reinforced insulated concrete panel in accordance with the present invention.

After the exterior architectural layer 202 has achieved a desired amount or degree of cure, the layer of insulating material 130 is removed, if present, and the side form members 204-210 are removed, if present. The resulting product is a composite reinforced concrete panel 212 that comprises the concrete panel 200, the attached foam insulating panel 14 and the exterior architectural layer 202 (FIG. 11). The composite reinforced concrete panel 212 is then ready to use. As shown in FIG. 11, the composite reinforced concrete panel 212 is raised from a horizontal position to a vertical position and positioned on the surface 13 of the concrete slab 12 to form a wall section of a building or other structure (not shown).

In an alternative disclosed embodiment, the composite concrete panel is constructed as described above; however, the exterior architectural layer 202 is formed from stucco, thin brick, tile, stone, stone veneer, such as limestone, granite, or marble, or metal panel facing and the like. In such an embodiment, the stucco, thin brick, tile, stone, stone veneer, such as limestone, granite, or marble, or metal panel facing and the like is adhered to the layer of reinforcing material 16, if present, or to the exterior surface 60 of the foam insulating panel 14.

In an alternative disclosed embodiment, the composite concrete panel is constructed as described above; however, the concrete panel 200 is made from a single layer of concrete, polymer modified concrete, polymer modified cement plaster, stucco, polymer modified geopolymer or polymer modified mortar and the exterior architectural layer 202 is formed from two layers of polymer modified concrete, plaster or mortar in the manner disclosed in applicant's co-pending patent application Ser. No. 13/626,087 filed Sep. 25, 2012. This method of forming a desired raised pattern of brick, tile or stone on the exterior architectural layer 202 is a relatively inexpensive and a relatively lightweight way to form a composite concrete panel having a desired pattern or shape, such as simulated brick, limestone, granite, marble or the like thereon.

In an alternative disclosed embodiment, the composite insulated concrete panel is constructed as described above; however, no panel anchor members, such as the panel anchor members 54, are used and no layer of reinforcing material 16 is used. The concrete panel 200 is formed directly on the upper primary surface 75 of the foam insulating panel 14, as described above. As a part of the present invention, it has been discovered that the concrete, plaster or mortar from which the concrete panel 200 is made forms a sufficiently strong adhesive bond with the foam insulating panel 14 that it can support the weight of the foam insulating panel and exterior architectural layer 202 without the panel anchor members, such as the panel anchor members 54, and without the layer of reinforcing material 16. Furthermore, the exterior architectural layer 202 also forms a sufficiently strong adhesive bond with the foam insulating panel 14 that it can support its own weight. This is particularly true when the exterior architectural layer 202 is made from a polymer modified concrete, polymer modified cement plaster, polymer modified geopolymer or polymer modified mortar, as described above, and the thickness of the exterior coating is not more than 2 inches, preferably not more than 1 inch, most preferably approximately 0.125 inches to approximately 0.5 inches. Additionally, it is preferred that the concrete, plaster or mortar mix from which the exterior architectural layer 202 is made include slag cement, or slag cement and fly ash, and reduced amounts of portland cement, or elimination of portland cement, as described below. Also, it is preferred that the concrete panel 200 be cured using the layer of insulating material 130 (or heated concrete blanket or heated concrete form), as described above, or in a steam curing room. It is especially preferred that the concrete panel 200 be cured in accordance with a predetermined temperature profile, as described above.

In an alternate disclosed embodiment, the exterior architectural layer 202 is first poured onto a form casting surface. Then, the foam insulating panel 14, with or without the layer of reinforcing material 16, is placed on top of the exterior architectural layer 202, followed by the structural concrete layer 84, as described above. This way the entire composite panel can be cast at once with both structural and non-structural wythes formed at the same time.

Figure 12:
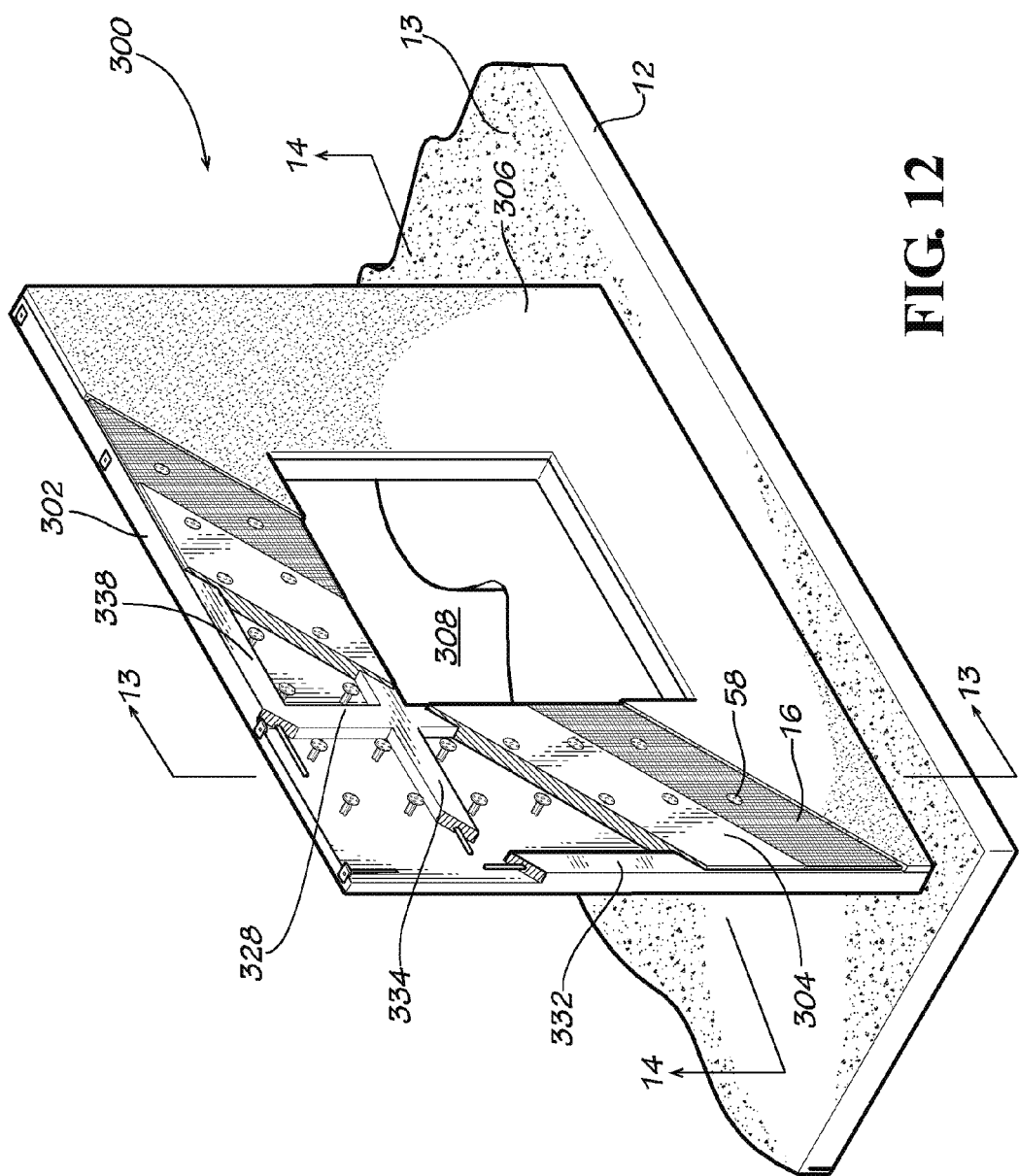
FIG. 12 is a partially cut away perspective view of an alternate disclosed embodiment of a composite reinforced insulated concrete panel in accordance with the present invention.
Figure 13:
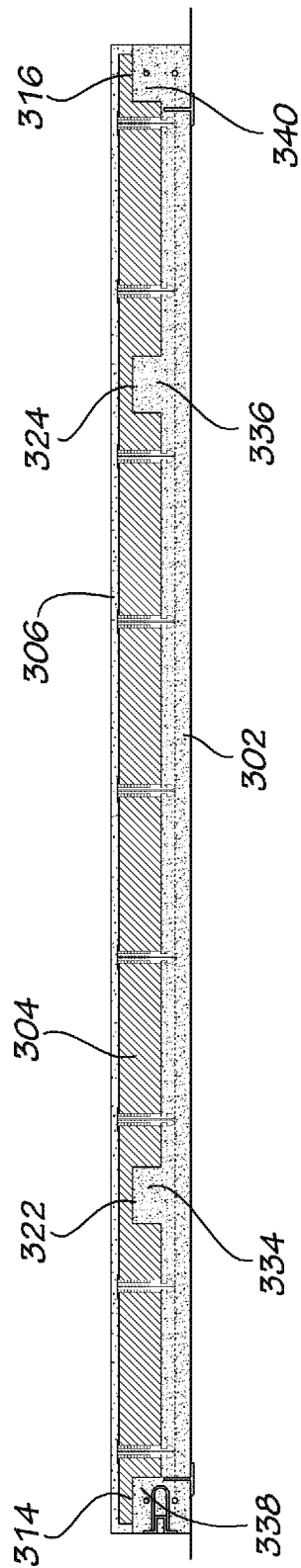
FIG. 13 is a cross-sectional view taken along the line 13-13 of the insulated concrete form shown in FIG. 12.
Figure 14:
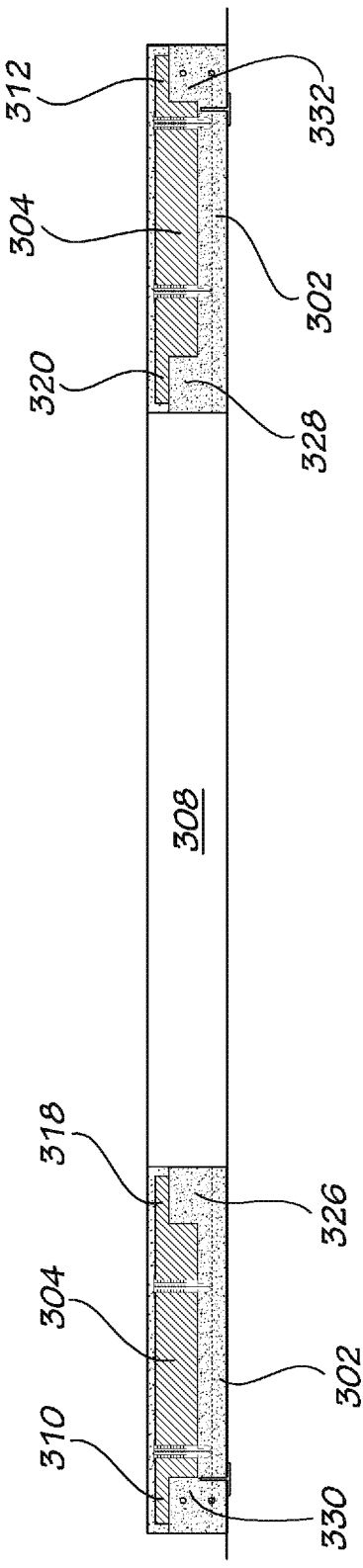
FIG. 14 is a cross-sectional view taken along the line 14-14 of the insulated concrete form shown in FIG. 12.

FIGS. 12-14 show an alternate disclosed embodiment of the present invention, which includes an opening, such as a window. Providing an opening in an exterior wall creates increased loads and/or stresses that require additional reinforcement. FIG. 12 shows a composite reinforced insulated precast concrete panel 300 in accordance with the present invention that can be used in multistory construction. The composite reinforced insulated concrete panel 300 comprises a concrete panel 302, an attached foam insulating panel 304 and an exterior decorative layer 306 and is made in the same manner as the composite reinforced insulated concrete panel 200 described above. However, in this embodiment an opening 308 is defined by the concrete panel 302 and the attached foam insulating panel 304. Specifically, the foam insulating panel 304 includes two transverse peripheral half channels 310, 312 and two longitudinal peripheral half channels 314, 316 which extend the full width and length of the foam insulating panel. The foam insulating panel 304 also defines two intermediate transverse channels 318, 320 and two intermediate longitudinal channels 322, 324 which extend the full width and length of the foam insulating panel. The transverse channels 318, 320 and half channels 310, 312 define four concrete reinforcing columns 326, 328, 330, 332, respectively. The longitudinal channels 322, 324 and half channels 314, 316 define four concrete reinforcing beams 334, 336, 228, 340, respectively. As can be seen, the columns 326, 328 and the beams 334, 336 frame the opening 308. The reinforcing columns 326-332 extend the full width of the concrete panel 302. Similarly, the reinforcing beams 334-340 extend the full length of the concrete panel 302. Since the reinforcing columns 326-332 and beams 334-340 extend the full width and length of the concrete panel 302, they provide excellent rigidity to the concrete panel even though it includes the opening 308. Furthermore, since the reinforcing columns 326, 328 and beams 334, 336 frame the opening 306, they provide a header, sill and joists into which a window casement (not shown) can be attached.

By using the structural reinforcing elements, as described above, reduced amounts of concrete can be used in the concrete panel of the present invention compared to conventional concrete panels of the prior art. For example, for a 24 feet by 12 feet panel 200 of the design shown in FIGS. 1-4, 6-11, where the reinforcing columns are spaced 48 inches on center, the concrete reinforcing columns are 8 inches thick (thickness "E") and 8 inches wide, while the concrete between the reinforcing columns is 3.5 to 4 inches thick (thickness "D"). This produces a concrete panel 200 that requires approximately 40% by volume less concrete than a concrete panel of 8 inches of uniform thickness of similar properties. Similarly, for a 24 feet by 12 feet concrete panel 302 of the design shown in FIGS. 12-14, where the reinforcing columns are spaced 48 inches on center, the concrete reinforcing columns are 6 inches thick (thickness "E") and 6 inches wide, while the concrete between the reinforcing columns are 3 inches thick (thickness "D"). This produces a concrete panel 302 that requires approximately 40% by volume less concrete than a concrete panel of 6 inches of uniform thickness of similar properties. By reducing the amount of concrete required for the panel, it reduces the amount of portland cement required, thereby also reducing the cost of the concrete panel. The reduced amount of concrete also reduces the weight of the concrete panel, which also reduces the structural requirements to support the concrete panel, which also reduces cost. These savings are all realized without sacrificing strength of the concrete panel, wind load or other load capability and flexural strength. In fact, the reinforced concrete panels of the present invention are more rigid, stronger, with higher structural properties than state of the art panels made with uniform thickness concrete.

FIGS. 15-19 show an alternate disclosed embodiment of the composite reinforced concrete panel of the present invention used as an exterior wall of a building or other structure. Or, the same configuration can be used to construct a sound abatement panel, such as would be used along a highway. FIGS. 15-19 show a first composite reinforced concrete panel 400 and a second composite reinforced concrete panel 402 mounted vertically below the first composite reinforced concrete panel. The first and second composite reinforced concrete panels 400, 402 are identical to each other and are essentially identical to the composite reinforced concrete panel 212, except they are not use in loadbearing conditions. For example, the first composite reinforced concrete panel 400 includes a reinforced concrete panel 404, an attached foam insulating panel 406 and an exterior decorative layer 408 over a layer of reinforcing material 410. The concrete panel 404 includes a plurality of reinforcing beams, such as the beams 412, 414, 415, 416, and a plurality of reinforcing columns, such as the columns 420, 422, 424. The second composite reinforced concrete panel 402 includes a plurality of reinforcing columns and beams, such as the beams 426, 428, 430.

Formed in each of the first and second composite reinforced concrete panel 400, 402 at the intersection of the peripheral columns, such as the columns 420, 424, and the beams, such as the beams 412, 414, 415, 416, 426, 428, 430 are a plurality of inserts, such as the inserts 432, 434, 436, 438, 440, 442, 444, 446, 448, 450. Each insert 432-450, such as the insert 436 (FIG. 19), includes a hollow sleeve 446 with female threads formed on the inside thereof, a plate 448 attached to the sleeve and an anchoring loop 450 attached to the plate. A rebar 452 passes through the anchoring loop 450 and hardened concrete within the anchoring loop securely attaches the inserts, such as the insert 436, securely in the concrete panel, such as the concrete panel 404.

Figure 19:
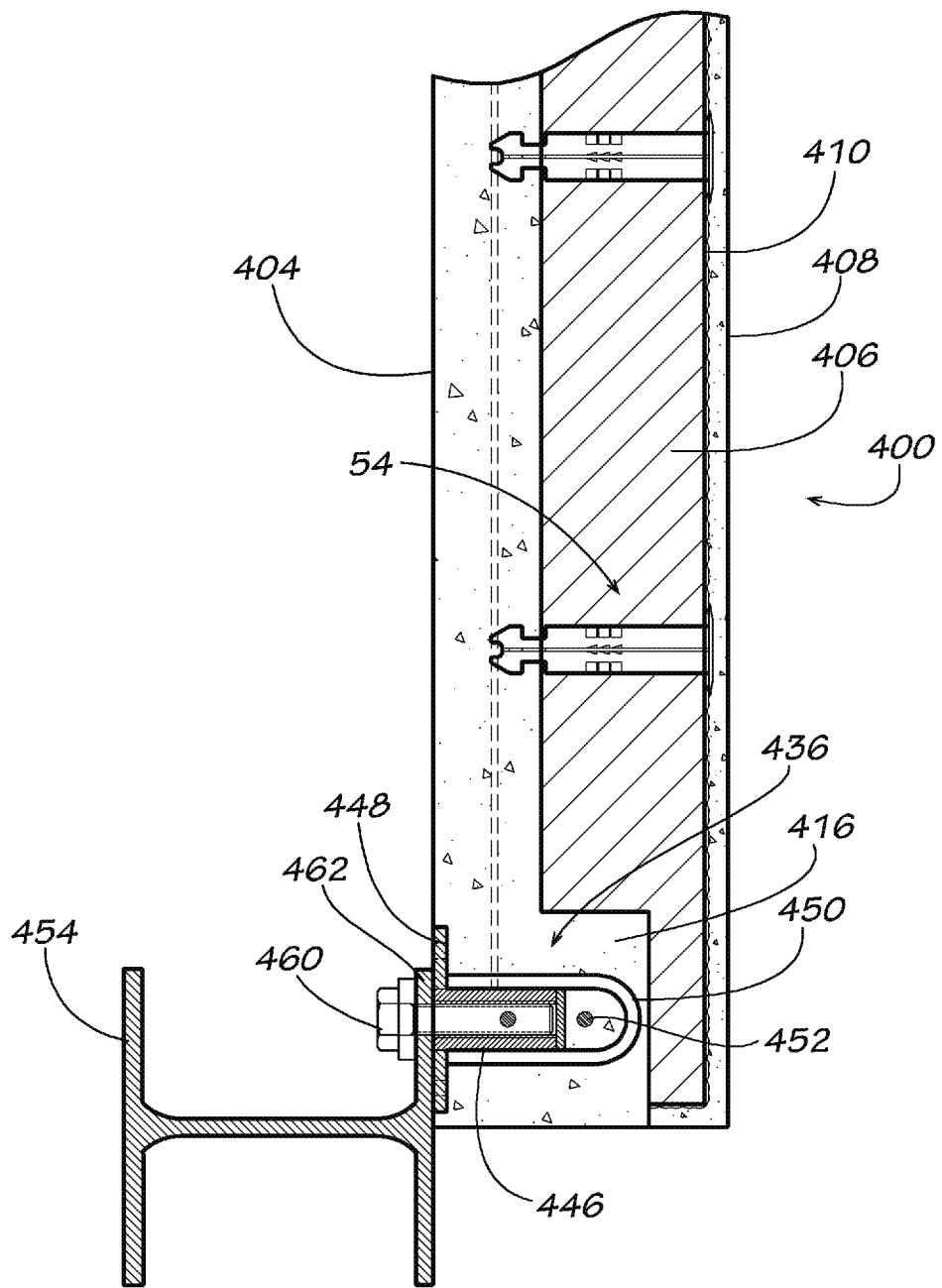
FIG. 19 is a partial detail cross-sectional view of the reinforced insulated concrete panel shown in FIG. 17.

The first and second composite reinforced concrete panels 400, 402 are each attached to two vertically disposed concrete columns or preferably steel I-beams 454, 456 horizontally spaced from each other a distance equal to the length of the first composite reinforced concrete panel. A bolt, such as the bolt 460, passes through one of the flanges of the I-beams, such as the flange 462 of the I-beam 454, and is screwed into the sleeve of each of the inserts, such as the sleeve 446 of the insert 436 (FIG. 19).

Figure 15:
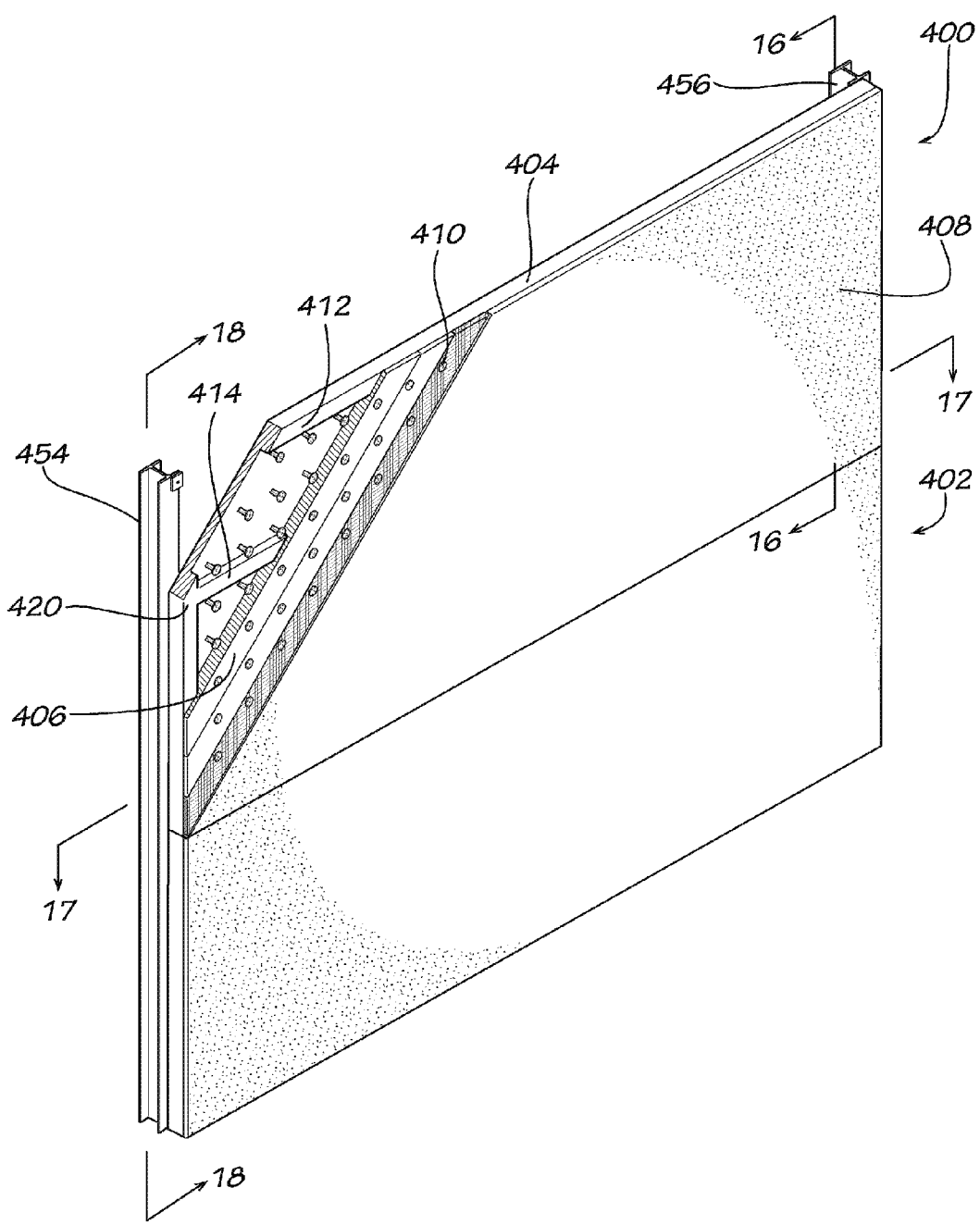
FIG. 15 is a partially cutaway perspective view of a disclosed embodiment of a reinforced insulated concrete panel in accordance with the present invention shown being used as a part of a building structure or as a sound abatement panel.

The structure shown in FIG. 15 is constructed as follows. The two I-beams 454, 456 and erected vertically and are secured in concrete footings (not shown) in the ground to hold the I-beams securely in position. The I-beam 454 is horizontally spaced from the I-beam 456 a distance equal to the length of the first composite reinforced concrete panel 400. Holes are drilled in the flanges of each of the I-beams 454, 456 and in alignment with the location of each of the inserts 432-450, such as a hole in the flange 462 of the I-beam 454 in alignment with the insert 436. The second composite reinforced concrete panel 402 is positioned vertically with its transverse edges against the flange of each of the I-beams 454, 456. The second composite reinforced concrete panel 402 is then attached to each of the I-beams 454, 456 by inserting bolts, such as the bolt 460, through the flange of each of the I-beams into the corresponding insert, such as the inserts 426-430, and tightening the bolts. Similarly, the first composite reinforced concrete panel 400 is positioned vertically with its transverse edges against the flange of each of the I-beams 454, 456 and above of the second composite reinforced concrete panel 402. The first composite reinforced concrete panel 400 is then attached to each of the I-beams 454, 456 by inserting bolts, such as the bolt 460, through the flange of each of the I-beams into the corresponding insert, such as the inserts 412-416, 444, and tightening the bolts.

The first and second composite reinforced concrete panels 400, 402 can be attached to the I-beams 454, 456 with the exterior coating 408 on the layer of reinforcing material 410, as shown in FIG. 15. Alternately, the first and second composite reinforced concrete panels 400, 402 can first be attached to the I-beams 454, 456 without the exterior coating 408. Then, the exterior coating 408 can be applied to both the first and second composite reinforced concrete panels 400, 402 at the same time.

Of course, additional composite reinforced concrete panels (not shown) can be positioned horizontally adjacent the first and second composite reinforced concrete panels 400, 402 and attached to the I-beams 454, 456 to form a wall, sound barrier or other structure of a desired length or configuration. Furthermore, an additional composite reinforced concrete panel (not shown) can be positioned vertically adjacent; i.e., above, the first composite reinforced concrete panel 400, and attached to the I-beams 454, 456 to form a wall, sound barrier or other structure of any desired height or configuration.

Figure 20:
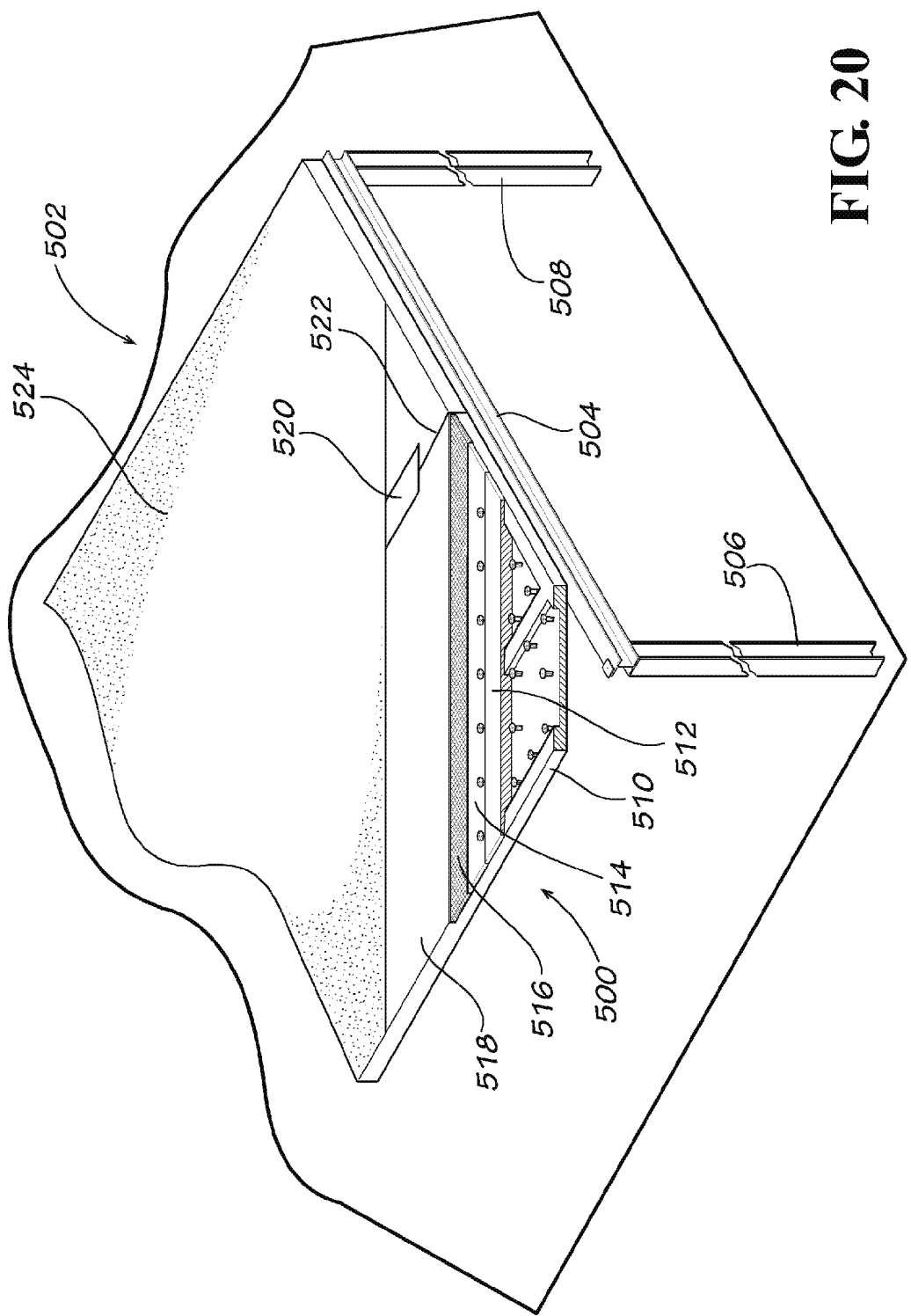
FIG. 20 is a partially cutaway perspective view of a disclosed embodiment of a reinforced insulated concrete panel in accordance with the present invention shown being used as a roof.
Figure 21:
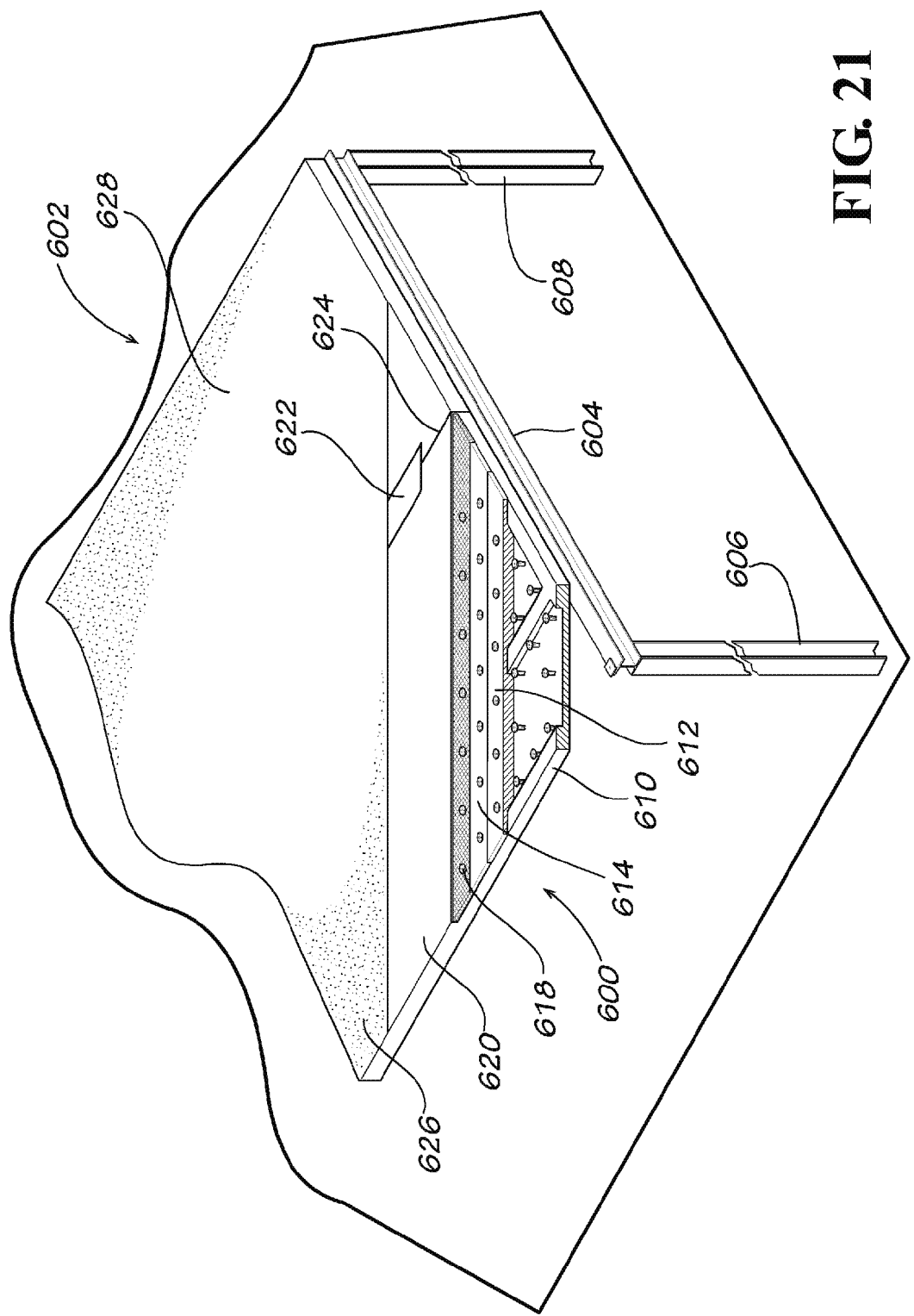
FIG. 21 is a partially cutaway perspective view of an alternate disclosed embodiment of a reinforced insulated concrete panel in accordance with the present invention shown being used as a roof.

FIGS. 20 and 21 show an alternate disclosed embodiment of the composite reinforced concrete panels 400, 402. FIG. 20 discloses first and second composite reinforced concrete panels 500, 502 identical to the first and second composite reinforced concrete panels 400, 402, except as described below. The first and second composite reinforced concrete panels 500, 502 are used as roofing panels, and, therefore, are disposed horizontally. The first and second composite reinforced concrete panels 500, 502 are attached to a horizontal steel I-beam roof joist 504, which is attached to and supported at opposite ends thereof by two vertical concrete columns or preferably steel I-beams 506, 508. The first and second composite reinforced concrete panels 500, 502 are attached to the horizontal I-beam roof joist 504 in the same manner as the first and second composite reinforced concrete panels 400, 402 are attached to the I-beams 454, 456; i.e., by inserting bolts, such as the bolt 460, through the flanges of the horizontal I-beam roof joist into a threaded insert in the concrete panel, such as the inserts 432-450.

The first composite reinforced concrete panel 500 includes a reinforced concrete panel 510 attached to a foam insulating panel 512. The concrete panel 510 includes a plurality of reinforcing beams or ribs and a plurality of reinforcing columns or ribs identical to those shown for the first and second composite reinforced concrete panels 400, 402. The first and second composite reinforced concrete panels 500, 502 are disposed with the concrete panel 510 facing the interior of a building or structure (i.e., facing down) and the foam insulating panel 512 facing the exterior of the building or structure (i.e., facing up).

On the surface of the foam insulating panel 512 opposite the concrete panel 510 is a layer of base coat 514 for a fluid applied roof membrane, which is optionally used to attach or laminated to the layer of reinforcing material 516. On top of the layer of reinforcing material 516 is a second layer of fluid applied roof membrane 518. Seam tape 520 is placed over the joint 522 between the first composite reinforced concrete panel 500 and the second composite reinforced concrete panel 502. Then, a top coat of fluid applied roof membrane 524 is placed over the seam tape 520 and the second layer of roof membrane 518 thereby forming the top layer of the roofing system.

Optionally, the first and second composite reinforced concrete panels 500, 502 can include a layer of cementitious material (not shown), identical to the layer of cementitious material 408 of the first composite reinforced concrete panel 400 disclosed above, on the layer of reinforcing material 516. The fluid applied roof membrane systems can then be applied on top of the layer of cementitious material of the first and second composite reinforced concrete panels 500, 502.

Fluid applied roof membranes are well known in the art. For example, Kemper System America, Inc., West Seneca, N.Y., USA sells a line of fluid applied roof membrane products including Kempertec EP/EP5-Primer with silica sand, Kempertec D-Primer, Kempertec AC primer with silica sand, Kempertec BSF-R Primer, Kemperol 2K-PUR with 165 fleece, Kemperol BR/BR-M with 165 fleece, and Kempertec TC traffic surfacing. These products are polyurethane-based, polyester-based and polymethylmethacrylate-based.

Sika Corporation, Lyndhurst, N.J., USA offers a fluid applied roof membrane product under the designation Sikalastic® RoofPro Liquid Applied Membrane. This product includes Sika® Bonding Primer (a two component prereacted epoxy resin dispersed in water and a waterborne modified polyamine solution), Sikalastic® 601 BC and Sikalastic® 621 TC are both moisture cured polyurethane-based systems. Sika® Reemat and Flexitape systems are a nylon mesh reinforcing system.

Siplast USA, Irving, Tex., USA offers a fluid applied roof membrane product under the designation Parapro PMMA Roof Membrane System. This product includes primers designated Pro Primer R, Pro Primer W and Pro Primer T (all polymethylmethacrylate based resins); Paradiene 20 underlayment and Parapro Roof Membrane Resin (a polymethylmethacrylate based resin).

FIG. 21 discloses first and second composite reinforced concrete panels 600, 602 identical to the first and second composite reinforced concrete panels 400, 402, except as described below. The first and second composite reinforced concrete panels 600, 602 are used as roofing panels, and, therefore, are disposed horizontally. The first and second composite reinforced concrete panels 600, 602 are attached to a horizontal steel I-beam roof joist 604, which is attached to and supported at opposite ends thereof by two vertical steel I-beams 606, 608. The first and second composite reinforced concrete panels 600, 602 are attached to a horizontal I-beam roof joist 604 in the same manner as the first and second composite reinforced concrete panels 400, 402 are attached to the I-beams 454, 456; i.e., by inserting bolts, such as the bolt 460, through the flanges of the horizontal I-beam roof joist into a threaded insert in the concrete panel, such as the inserts 432-450.

The first composite reinforced concrete panel 600 includes a reinforced concrete panel 610 attached to a foam insulating panel 612. The concrete panel 610 includes a plurality of reinforcing beams and a plurality of reinforcing columns identical to those shown in the first and second composite reinforced concrete panels 400, 402. The first and second composite reinforced concrete panels 600, 602 are disposed with the concrete panel 610 facing the interior of a building or structure (i.e., facing down) and the foam insulating panel 612 facing the exterior of the building or structure (i.e., facing up).

On the surface of the foam insulating panel 612 opposite the concrete panel 610 is a liquid applied weather membrane 614, as described above, and a layer of reinforcing material 618. Optionally, on top of the layer of reinforcing material 618 is a layer of cementitious material 620. The layer of cementitious material 620 is identical to the layer of cementitious material 408 of the first composite reinforced concrete panel 400 disclosed above. Seam tape 622 is placed over the joint 624 between the first composite reinforced concrete panels 600 and the second composite reinforced concrete panels 602. On top of the seam tape 622 and layer of cementitious material 620, if present, or the layer of reinforcing material 618, if the layer of cementitious material is not present, are first and second sheets of polymeric roof membrane 626, 628, such as EPDM (ethylene propylene diene monomer (M-call) rubber), PVC (polyvinyl chloride) or TPO (thermoplastic polyolefin). The polymeric roof membrane 626, 628 is attached to the layer of cementitious material 620, if present, or the layer of reinforcing material 618 by a suitable adhesive. The first sheet of polymeric roof membrane 626 is attached to the second sheet of polymeric roof membrane 628 by methods known in the art, such as by hot air welding.

Firestone Building Product, Indianapolis, Ind., USA offers a TPO roof membrane system designated UltraPly TPO Roofing System and an EPDM roof membrane system under the designation RubberGard EPDM. GAF Corp., Wayne, N.J., USA offers a TPO roof membrane system designated EverGardTPO single ply roofing membrane. Overlapping sheets of TPO roofing membrane, such as the sheets 626, 628, are joined together by hot air welding.

While the present invention can be used with conventional concrete mixes; i.e., concrete in which portland cement is the only cementitious material used in the concrete, it is preferred as a part of the present invention to use the concrete, plaster or mortar mixes disclosed in applicant's co-pending patent application Ser. No. 13/626,540 filed Sep. 25, 2012 (the disclosure of which is incorporated herein by reference in its entirety). Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Specifically, the concrete mix in accordance with the present invention comprises cementitious material, aggregate and water sufficient to at least partially hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cementitious material ratio by weight is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 60% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete including, but not limited to, aggregate meeting the requirements of ASTM C33. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of portland cement and increased amounts of recycled supplementary cementitious materials; i.e., slag cement and/or fly ash. This results in cementitious material and concrete that is more environmentally friendly. One or more cementitious materials other than slag cement or fly ash can also replace the portland cement, in whole or in part. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than portland cement, slag cement or fly ash. Such other inert or filler materials include, but are not limited to, limestone powder; calcium carbonate; titanium dioxide; quartz; or other finely divided minerals that densify the hydrated cement paste.

The preferred cementitious material for use with a disclosed embodiment of the present invention comprises 0% to approximately 100% by weight portland cement; preferably, 0% to approximately 80% by weight portland cement. The ranges of 0% to approximately 100% by weight portland cement and 0% to approximately 80% by weight portland cement include all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material comprises approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention, especially for the concrete panel 200, also comprises 0% to approximately 50% by weight fly ash; preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash or any sub-combination thereof. Preferably the fly ash has an average particle size of <10 μm; more preferably 90% or more of the particles have a particles size of <10 μm.

The preferred cementitious material for use in one disclosed embodiment of the present invention, especially for the exterior architectural layer 202, also comprises 0% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 μm; more preferably 90% or more of the particles have a particles size of <10 μm.

In one disclosed embodiment, the preferred cementitious material for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

The cementitious material disclosed above can also optionally include 0% to approximately 50% by weight ceramic fibers, preferably 0% to 40% by weight ceramic fibers, more preferably 0% to 30% by weight ceramic fibers, most preferably 0% to 20% by weight ceramic fibers, especially 0% to 15% by weight ceramic fibers, more especially 0% to 10% by weight ceramic fibers, most especially 0% to 5% by weight ceramic fibers. Wollastonite is an example of a ceramic fiber. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

In one disclosed embodiment, the cementitious material for use with the present invention comprises 0% to approximately 100% by weight portland cement, 0% to approximately 90% by weight slag cement, and 0% to approximately 80% by weight fly ash. In one disclosed embodiment, the cementitious material for use with the present invention comprises 0% to approximately 80% by weight portland cement, 0% to approximately 90% by weight slag cement, and 0% to approximately 80% by weight fly ash. In another disclosed embodiment, the cementitious material for use with the present invention comprises 0% to approximately 70% by weight portland cement, 0% to approximately 90% by weight slag cement, and 0% to approximately 80% by weight fly ash. In another disclosed embodiment, the cementitious material for use with the present invention comprises 0% to approximately 60% by weight portland cement, 0% to approximately 90% by weight slag cement, and 0% to approximately 80% by weight fly ash. In another disclosed embodiment, the cementitious material for use with the present invention comprises 0% to approximately 50% by weight portland cement, 0% to approximately 90% by weight slag cement, and 0% to approximately 80% by weight fly ash. In another disclosed embodiment, the cementitious material for use with the present invention comprises less than 50% by weight portland cement, 10% to approximately 90% by weight slag cement, and 10% to approximately 80% by weight fly ash. In another disclosed embodiment, the cementitious material for use with the present invention comprises approximately 10% to approximately 45% by weight portland cement, approximately 10% to approximately 90% by weight slag cement, and 10% to approximately 80% by weight fly ash. In another disclosed embodiment, the cementitious material for use with the present invention comprises approximately 10% to approximately 40% by weight portland cement, approximately 10% to approximately 90% by weight slag cement, and 10% to approximately 80% by weight fly ash. In another disclosed embodiment, the cementitious material for use with the present invention comprises approximately 10% to approximately 35% by weight portland cement, approximately 10% to approximately 90% by weight slag cement, and 10% to approximately 80% by weight fly ash.

In another disclosed embodiment, the cementitious material for use with the present invention, especially for the exterior architectural layer 202, comprises 0% to approximately 100% by weight portland cement; 0% to approximately 90% by weight slag cement; 0% to approximately 80% by weight fly ash; 0% to 10% by weight Wollastonite; and 0% to approximately 25% by weight calcium oxide, calcium hydroxide, latex, acrylic or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 15% by weight ceramic fiber. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 15% by weight ceramic fiber. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises less than 50% by weight portland cement; 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 10% by weight ceramic fiber.

In another disclosed embodiment, the cementitious material for use with the present invention comprises 0% to approximately 100% by weight portland cement; 0% to approximately 90% by weight slag cement; 0% to approximately 80% by weight fly ash; 0% to 30% by weight Wollastonite; and 0% to approximately 25% by weight calcium oxide, calcium hydroxide, or latex, acrylic, or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 30% by weight Wollastonite. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises less than 50% by weight portland cement; 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 30% by weight Wollastonite.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight polymer for making polymer modified concrete, mortar or plaster.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber.

In another disclosed embodiment, the cementitious material for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; 0.1% to approximately 50% by weight ceramic fiber and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber and 0.1% to approximately 50% by weight polymer for making polymer modified concrete, mortar or plaster.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. If dry polymer powder is used, it can be combined with the cementitious material and mixed together to form a uniform blend prior to combining with the aggregate or water. If the polymer is a liquid, it can be added to the cementitious material and combined with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures or additional supplementary cementitious material ("SCM") can also be used with the concrete of the present invention. Such mineral admixtures include, but are not limited to, silica fume and high reactivity metakaolin. Although mineral admixtures can be used with the concrete of the present invention, it is believed that mineral admixtures are not necessary.

For the thin exterior architectural layer 202, any type of mortar, stucco, geopolymers, cement plaster, cementitious or polymer modified cement, polymer modified plaster, polymer modified mortar, stucco, acrylic base coat and finish coat materials can be used to achieve any architectural type finish, texture or color.

The concrete mix cured in a concrete form in which the temperature of the curing concrete is controlled in accordance with the present invention, especially controlled to follow a predetermined temperature profile, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at seven days the concrete mix cured in accordance with the present invention has a compressive strength at least 25% greater than the same concrete mix would have after seven days in a conventional (i.e., non-insulated) concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement, slag cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and slag cement in amounts such that at seven days the concrete mix cured in accordance with the present invention has a compressive strength at least 25% greater than the same concrete mix would have after seven days in a conventional concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

As a part of the present invention, it has been found that concrete, mortar or other cementitious-based materials, especially polymer modified concrete, will bond quite securely with expanded polystyrene foam that has been cut from a block of foam that was first formed in a mold. During expanded polystyrene manufacture, the foam beads are fused with steam under high pressure. Under steam and pressure, the foam beads expand against the surface of the mold encasement. During this process, the exterior surface of the expanded polystyrene block is more compact and dense. The exterior surface of the molded block is made of each of the unmolested foam beads pressed against the molding surface. Once the foam block is cured and cut with a hot wire, the fresh cut surface has a more complex interstitial space opened up between the individually cut foam beads. Polystyrene beads start softening at a temperature of approximately 80 to 90° C. Neopor brand expanded polystyrene board has an even lower melting point then standard expanded polystyrene board. In the present concrete form when the concrete heat of hydration is retained by insulation, the concrete can reach up to 60-70° C. for a sustained period of time. The expanded polystyrene board kept in direct contact with the concrete at elevated temperatures for an extended period of time close to the polystyrene softening temperature will fuse or bond to the concrete better than the foam will bond to the same concrete at normal ambient temperature. In addition the opened individual cell structure created by the cutting wire or knives provides an even better bond with concrete at elevated temperature. This is a significant improvement of adhesion between concrete and any extruded or expanded foam panels that have not been cut into sheets from an initial block so that the surface of the foam does not have a polished or shinny surface. Suitable polystyrene foam can be obtained by cutting, such as with a knife blade, a saw or a hot wire, foam panels of a desired thickness from a larger block of polystyrene foam. The polystyrene is preferably polystyrene that includes graphite particles within the polystyrene beads such as made by BASF under the trademark Neopor® and which is commercially available from Georgia Foam, Gainesville, Ga. and such as disclosed in U.S. Pat. Nos. 6,130,265; 6,362,242; 6,340,713; and 6,414,041 (the disclosures of which are all incorporated herein by reference in their entirety). The bond between the concrete, mortar or other cementitious-based materials and polystyrene foam is also enhanced by using the concrete mix comprising portland cement, slag cement and fly ash, as disclosed above. Furthermore, the bond between the concrete, mortar or other cementitious-based materials and polystyrene foam is also enhanced by curing the concrete, mortar or other cementitious-based materials in insulated concrete forms or molds, as disclosed herein. Additionally, the bond between the concrete, mortar or other cementitious-based materials and polystyrene foam is also enhanced by curing the concrete, mortar or other cementitious-based materials at elevated temperatures, such as produced by the hydration of cementitious material and retained by the insulated concrete forms, electrically heated blankets, electrically heated concrete forms or steam curing, for example above 120° F. (approximately 50° C.), preferably above 140° F. (approximately 60° C.), for an extended period of time, such as 12 hours to 1 day; preferably, 1 day to 3 days, most preferably above 150° F. (approximately 65° C.) for 1 to 12 hours. Under these conditions, the concrete, mortar or other cementitious-based materials and polystyrene foam seem to fuse together. In fact, the bond between the concrete, mortar or other cementitious-based materials and polystyrene foam, as disclosed above, is so strong that the bond between individual polystyrene foam beads will fail before the bond between the concrete, mortar or other cementitious-based materials and the polystyrene foam.

It is specifically contemplated that the cementitious-based material from which the concrete panel 200 and the exterior architectural layer 202 are made can include reinforcing fibers made from material including, but not limited to, steel, plastic polymers, glass, basalt, carbon, and the like. Many different types of steel fibers are known and can be used in the present invention, such as those disclosed in U.S. Pat. Nos. 6,235,108; 7,419,543 and 7,641,731 and PCT patent application International Publication Nos. WO 2012/080326 and WO 2012/080323 (the disclosures of which are incorporated herein by reference in their entireties). Particularly preferred steel fibers are Dramix® 3D, 4D and 5D steel fibers available from Bekaert, Belgium and Bekaert Corp., Marietta, Ga., USA. Plastic fibers can also be used, such as those disclosed in U.S. Pat. Nos. 6,753,081; 6,569,525 and 5,628,822 (the disclosures of which are incorporated herein by reference in their entireties). It is also preferred to use ceramic fibers, especially acicular type fibers, such as Wollastonite, in the concrete used for the concrete panel 200 and the exterior architectural layer 202. The use of reinforcing fibers is particularly preferred in the concrete panel 200 and the exterior architectural layer 202 made from polymer modified concrete, polymer modified mortar and polymer modified plasters, which provide the lightweight composite insulated concrete panel in accordance with the present invention improved flexural strength, as well as improved wind load capability and blast resistance.

Although the concrete panels 200, 302 are shown as being used as vertical wall components, it is specifically contemplated that the concrete panels can be used for horizontal applications, such as elevated slabs, such as parking lot decks or multistory building flooring. For such horizontal applications, it may be desirable to include additional reinforcing depending on design criteria. In such cases, pre-tension or post-tension cables can be included in the concrete panels 200, 302, specifically by placing the cables in the reinforcing elements, such as columns, beams and ribs, such as within one or more of the beams 88, 100, 104 and columns 86, 90-98, 102. Suitable post-tension cables are commercially available from Continental Structures, Alpharetta, Ga., USA.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A pre-cast product comprising:
   a first layer of foam insulating material having a first primary surface and an opposite second primary surface, wherein the second primary surface defines a continuous plane;
   a concrete member disposed on the first primary surface of the first layer of foam insulating material, the concrete member having a first surface and an opposite second surface, wherein the first surface of the concrete member is adjacent the first layer of foam insulating material;
   at least one pre-stressed cable disposed within the concrete member; and
   an elongate anchor member in the first layer of foam insulating material and extending from the first primary surface of the first layer of foam insulating material into the concrete member, wherein the elongate anchor member has a definite length defined by a first end and an opposite second end, wherein the first end comprises a first enlarged portion flush with the second primary surface of the first layer of foam insulating material and wherein the second end of the elongate anchor member is disposed between the first and second surfaces of the concrete member and wherein the second end comprises a second enlarged portion such that the second end interlocks with the concrete member.

2. The pre-cast product of claim 1, wherein the first layer of foam insulating material comprises expanded polystyrene foam, polyisocyanurate foam or polyurethane foam.

3. The pre-cast product of claim 1, wherein the elongate anchor member extends through the first layer of foam insulating material from the second primary surface to the first primary surface.

4. The pre-cast product of claim 1 further comprising a layer of reinforcing material disposed on the second primary surface of the first layer of foam insulating material.

5. The pre-cast product of claim 1, wherein the first layer of foam insulating material has an R-value of greater than 1.5.

6. The pre-cast product of claim 1, wherein the first layer of foam insulating material has an R-value of greater than 4.

7. The pre-cast product of claim 1, wherein the first layer of foam insulating material has an R-value of greater than 10.

8. The pre-cast product of claim 1, wherein the first layer of foam insulating material has an R-value of approximately 5 to 40.

9. The pre-cast product of claim 8 further comprising a second layer of foam insulating material disposed on the second surface of the concrete member.

10. The pre-cast product of claim 9, wherein the second layer of foam insulating material has an R-value of approximately 5 to 40.

11. The pre-cast product of claim 1, wherein the first layer of foam insulating material has an R-value of approximately 10 to 40.

12. The pre-cast product of claim 1 further comprising a second layer of foam insulating material disposed on the second surface of the concrete member.

13. The pre-cast product of claim 12 further comprising a layer of reinforcing material disposed on the second primary surface of the second layer of foam insulating material.

14. The pre-cast product of claim 12, wherein the second layer of foam insulating material has an R-value of greater than 1.5.

15. The pre-cast product of claim 12, wherein the second layer of foam insulating material has an R-value of greater than 4.

16. The pre-cast product of claim 12, wherein the second layer of foam insulating material has an R-value of greater than 10.

17. The pre-cast product of claim 12, wherein the second layer of foam insulating material has an R-value of approximately 5 to 40.

18. The pre-cast product of claim 12, wherein the second layer of foam insulating material has an R-value of approximately 10 to 40.

* * * * *